United States Patent [19]

Cour et al.

[11] 4,019,176
[45] Apr. 19, 1977

[54] SYSTEM AND METHOD FOR RELIABLE COMMUNICATION OF STORED MESSAGES AMONG STATIONS OVER A SINGLE COMMON CHANNEL WITH A MINIMIZATION OF SERVICE MESSAGE TIME

[75] Inventors: Jean M. Cour; Jean F. Suchard, both of Paris, France

[73] Assignee: Centre d'Etude et de Realisation en Informatique Appliquee - C.E.R.I.A., Paris, France

[22] Filed: June 19, 1975

[21] Appl. No.: 588,497

[30] Foreign Application Priority Data

June 21, 1974 France .................. 74.21717

[52] U.S. Cl. .............. 340/172.5; 179/15 AL
[51] Int. Cl.² ............ G06F 3/04; H04J 3/04; H04J 3/08; H04J 3/06
[58] Field of Search ........... 340/172.5; 179/15 AL

[56] References Cited

UNITED STATES PATENTS

| | | | |
|---|---|---|---|
| 3,564,145 | 2/1971 | Deutsch | 179/15 AL |
| 3,597,549 | 8/1971 | Farmer | 179/15 AL |
| 3,632,881 | 1/1972 | Graham | 179/15 AL |
| 3,646,274 | 2/1972 | Nadir | 179/15 AL |
| 3,680,056 | 7/1972 | Kropel | 179/15 AL |
| 3,697,959 | 10/1972 | Abramson | 340/172.5 |
| 3,718,768 | 2/1973 | Abramson | 179/15 AL |
| 3,787,627 | 1/1974 | Abramson | 179/15 AL |
| 3,890,471 | 6/1975 | Hachenburg | 179/15 AL |
| 3,891,804 | 6/1975 | Hachenburg | 179/15 AL |

Primary Examiner—James D. Thomas
Attorney, Agent, or Firm—William R. Woodward

[57] ABSTRACT

A characteristic message exchange procedure is performed by a set of controller units at separate stations and of functionally identical design. The combination of a controller unit and a utilization unit that characterizes the application of the station constitutes a complete station. Among other things, the controller units provide sequencing of the transmitting privilege among the stations one by one. All message data are classified into four basic message models representing the applications of the stations. The stations are interconnected by a single common transmission channel and the controllers are equipped to be sensitive to only four basic message models. No central control unit is required for monitoring transmissions between stations. All active stations receive all messages essentially simultaneously. The channel may be a unidirectional wire line looping the stations, in which case essentially simultaneous reception by all is provided by passing on the received signals, even at an addressed station, without intermediate storage and continued circulation is prevented only by blocking the received message at the station that is transmitting.

11 Claims, 13 Drawing Figures

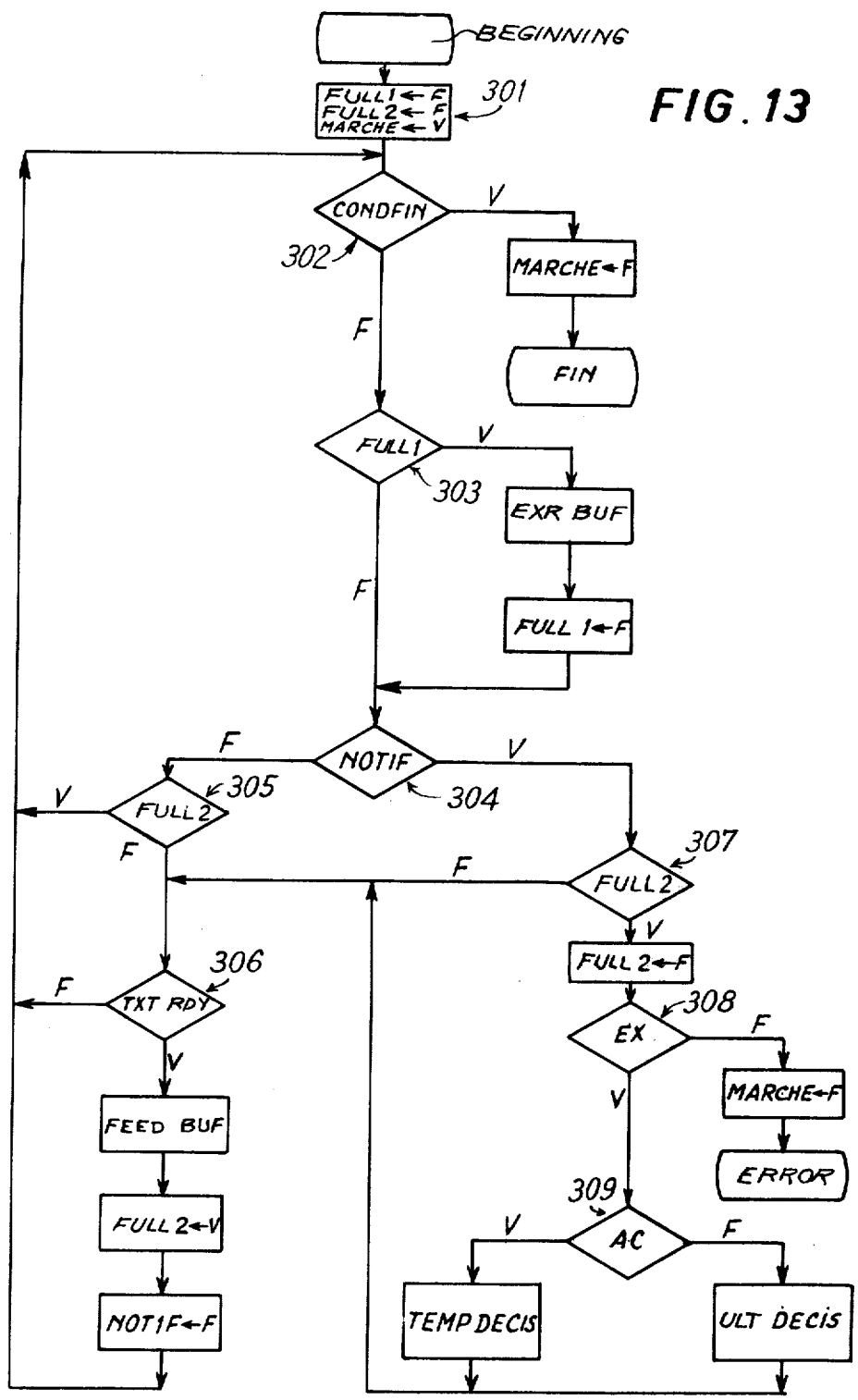

SYSTEM AND METHOD FOR RELIABLE COMMUNICATION OF STORED MESSAGES AMONG STATIONS OVER A SINGLE COMMON CHANNEL WITH A MINIMIZATION OF SERVICE MESSAGE TIME

| TABLE OF CONTENTS | Column |
|---|---|
| Background of the Invention (Prior Art) | 1 |
| First Principle of the Invention - An Efficient Classification of Messages | 2 |
| Second Principle of the Invention - Identical Controlling members of All Stations | 3 |
| Summary of the Invention | 4 |
| Brief Description of the Drawings | 7 |
| General Description of the Preferred System | 8 |
| Operation of the System | 10 |
| Internal States of a Station | 13 |
| Transitions between States (FIG. 4) | 14 |
| Detailed Description of a Preferred System (FIGS. 5–12) | 18 |
| Operation of the System | 27 |
| Illustrative Operation of a Utilization Device (FIG. 13) | 30 |

The invention relates to a method and a system for transmitting messages adapted to ensure, with reliability, the transfer of information between a plurality of stations interconnected by a single common channel in a transmission medium of any known type such as electrical, radio-electrical, optical or sound. More particularly, the invention concerns a method and a system that enables transfer of information between the stations with a maximum proportion of the channel time for the information to be transferred and a minimum proportion for the administration of the channel, and furthermore, a method and system in which stations can become inactive and resume activity at random without interfering with the efficiency of information transfer among the other stations.

BACKGROUND OF THE INVENTION (Prior Art)

In the previously known applications of automatic information handling which involve the transmission of messages between remote stations the costs are largely determined by the complexity of the members of the system controlling the transmission, and likewise of the programs or microprograms associated with their operation. To a large extent, this complexity results from the structure of the connecting networks, and from the rules for linking the messages, constituting the procedure which has been agreed between the various stations.

In current practice the connecting channels are of the type using metallic lines or radio, which convey series of modulated signals, and the messages are series of characters, generally selected in a binary code.

A distinction is conventionally made between at least two classes of message, the arrangement of which, at the level of the characters, is precisely determined within the framework of a given procedure: firstly the class of text messages, which convey the data, and secondly, the class of service messages.

A text message comprises on the one hand functional characters which identify its nature and on the other hand a series of characters constituting a text, which represent the actual data which the station transmitting the message is sending to one or more receiving stations.

The service messages ensure the coherence of the exchanges, by assuming the functions of selection, of interrogation, of positive acknowledgement of reception (transmission recognized as correct) or negative acknowledgement (error in transmission recognized), of indicating the end of transmission any any other functions considered advisable according to the nature of the network.

In the present networks, and their associated procedures, a large number of different service messages are provided. In proportion, the time devoted to occupying the connecting channel for service messages is high in comparison with the time devoted to the text messages, which considerably reduces the effective output of information in comparison with the nominal capacity of the connecting channel used.

On the other hand, the complexity of the means providing control of the network increases greatly with the number of service messages and the number of combinations which result in time.

Finally, the multiplication of the cases of error with the number of combinations of messages means that complex and extensive error avoiding, error detection and error correcting means have to aid these controlling members to ensure the continuity of the service.

Furthermore, if exchange of messages must be able to take place between a number of stations greater than two, a main or master control device is generally provided to centralize all the messages transmitted by the various stations and to process them with a view to their retransmission to the ultimate destination station or stations. This central control device obviously increases in complexity with the numbers of stations in the system. Moreover, when it is desired to evolve this system, by eliminating, or more often by adding stations, it becomes necessary to make corresponding modifications to the central control device. Likewise, it is obvious that a disturbance or breakdown affecting this central control device has repercussions on the operation of the whole of the system.

FIRST PRINCIPLE OF THE INVENTION — AN EFFICIENT CLASSIFICATION OF MESSAGES

The object of the present invention is to realize a method and system transmission for communication of messages among a plurality of stations which eliminates or mitigates all the disadvantages mentioned above. For this purpose, the transmission system of the invention is radically different from the known systems, both with regard to the selection of the different classes of message which have to be transmitted and identified by distinctive codes and to the constitution of the structure and mode of operation of the whole system.

The first principle of the invention is therefore embodied in the result of a process of modelization to represent the necessary and sufficient minimum of all the types of message liable to be transmitted between all the stations in a system of message transmission. This minimum number of models or types of messages, for the most versatile and resourceful system according to the invention is four, although according to the invention less than all four of these models can be used to advantage in methods of communication with less stringent requirements. Each message in the preferred system and method is exclusively in the form of one or the other of the four following models of messages:

a. Model DON, comprising at least one function character representing the function of data transmission, at least one address character E identifying the transmitting station, at least one address character identifying the intended receiving station, and a train of characters beginning with at least one character L specifying the length of the text portion TXT represented by the remaining characters in this first mode of messages;

b. Model ENT, comprising at least one function character representing the function of maintenance of the operation of the transmission system, at least one address character E identifying the transmitting station and at least one address character D identifying the intended receiving station;

c. Model FIN, comprising at least one function character representing the double function of (d) maintenance of the operation of the system and, this maintenance having been ensured, of (2) cessation of communication of the station which has transmitted the model FIN message, at least one address character E identifying the transmitting station and at least one address character D identifying the intended receiving station; and d. Model NEG, consisting exclusively of one or more function characters representing only the function of negative acknowledgement of reception.

this first principle, of the invention, which consists, in the preferred method and system, in limiting to four the models of all the messages liable to circulate in the system, is fundamental because it enables the organization of the structure of the stations and the mode of operation of these structures to be simplified to the greatest extent, as will be seen later.

In the following description and for ease of explanation, the following abbreviations will be used:

| Abbreviation | Model of message |
| --- | --- |
| Message DON | Message of model DON for the transmission of data |
| Message ENT | Message of model ENT for maintenance of operation of the system |
| Message FIN | Message of model FIN for maintenance of operation of the system and then for cessation of communication |
| Message NEG | Message of model NEG for negative acknowledgement of reception |

SECOND PRINCIPLE OF THE INVENTION IDENTICAL CONTROLLING MEMBERS AT ALL STATIONS

The second principle of the invention is that to utilize the messages efficiently modelized as above outlined, the stations of the system should all have the same information output capability and the reception of any messages circulating in these transmission means should be possible by any station.

More particularly, each station comprises a utilization member peculiar to each station according to the practical application envisaged, and a controlling member which is connected to this utilization member and, is functionally identical for all the stations. The controlling members, which are all identical, are all capable of being connected to the common communication channel and equipped with a set of functional means respectively sensitive exclusively to one or the other of the messages DON, ENT, FIN or NEG, or to their absence and in response thereto initiate operations to:

a. authorize at a given moment the transmission of a single message over the communication channel by a single station, b. detect the transmission of this single message, this detection ensuring, in particular, the function of acknowledgement of reception for the preceding message, and c. then pass on the authority for transmission of a single message, still to a single station.

The function (c) just mentioned, according to the invention, utilizes a list of existing stations in a predetermined closed (looped) order, to which active or inactive status indications may be keyed and stored.

According to this very generic second principle, of the invention, it will be understood that there is no structural or functional hierarchy between the various stations, which can be as numerous as is technologically possible, all the stations being potentially capable of the same performance. It will also be seen that there is no longer a central control member in this type of network organization. Thus a system of message transmission is available in which each station forms a module and it is possible to add to or subtract from the system as many modules as desired without having to modify the rest of the system in any way. Naturally, it follows that the reliability of the whole is increased because each module can be isolated from the whole.

Another concept of the invention is a communication control member capable of exchanging messages, modelized in accordance with the above process, with other identical control members to which it is connected by unidirectional transmission means or by some other communication channel, such as an assigned radio frequency, within a transmission system as defined generically above.

SUMMARY OF THE INVENTION

Briefly, the system of the invention is a communication system for a plurality of mutually remote stations linked by a transmission channel so interconnecting the stations that when one of the stations sends, all the others receive it essentially simultaneously, that is, without interposing unnecessary delays in the transmission channel. Each station is provided with means for transmitting bit sequence messages selectively in any of four different formats at a rate within a predetermined tolerance of a predetermined rate, each of the formats being preceded by a synchronization signal that identifies the beginning of the message, the first format including a predetermined control code specific to said first format for indicating to all stations the active status of the sending station as well as the format of the message being sent; a source address code that unambiguously identifies the sending station; a destination address code that points unambiguously to one station which is intended to accept the following data field and then send the next message within a predetermined maximum delay, and a data field; the second message format including a control code specific to said second format that indicates to all stations the active status of the sending station as well as designating the format of the message being sent, a source address code as in the case of the first format, and a destination address code that points unambiguously to one station which is intended to send the next message within the same predetermined maximum delay, the third format including a control code specific to the third format that indicates to all stations the end of activity of the sending station as well as the designation of the message format, and source address code and destination address code as in the second format, and the fourth format including only a control code specific to said fourth format that indicates to an immediately previously sending station the need for sending again a previously transmitted message. The transmitting means are interconnected with the following other means provided at each station: receiving means for detecting the state of the transmission channel and thereby detecting the beginning of each message and receiving the succeeding parts of each message bit string; means for detecting the end of each message bit string; means for identifying received control codes; means for recognizing a received destination address code as the stations own address code; means for detecting detectable errors in messages; first storage means responsive to the received control code identifying and destination address code recognizing means for storing the source address code received and storing the data field of a message of the first format; second storage means for storing and delivering to the transmitting means the data to be transmitted and the relate destination address code for these data; third storage means for recording the current activity status of all stations in response to whether replies are received by the receiving means within a predetermined time after the transmission of a message by any station addressed to any other station; status control means responsive to the receiving means, the control code identifying means and the destination address code recognizing means for recording the status of the source station of any message identified by its control code as of the first, second or third format with reference to the source address code received by the receiving means and also for updating the status of a destination station related to data pending for transmission in the second storage means, and also for scanning the third storage means to select the next active station that follows the transmitting station according to a predetermined looped listing order of the stations which is provided for reference at all stations; first timing means responsive to the transmission of a message of the first, second or third format of which the delay is greater than the predetermined maximum delay; second timing means responsive to the receiving means of the messages and detecting means, for detecting, a delay significantly larger than the the predetermined maximum delay within which no message is received, and state control means, including a logic network responsive to all the previously mentioned means for automatically selecting the next step in all-automatic operation of the station in response to received messages, to determination of delays by said first and second timing means, to whether the second storage means holds data to be transmitted by the transmitting means, and likewise in response to a local activity command switch included in the state control means.

The state control means includes a state register capable of being set to correspond to five states and at interconnection processor by which the appropriate state is registered and the appropriate action during registration of each state is commanded as aforesaid. The five states include a passive state which the control member is continually put back into its initial state, a beginning state in which received messages are analyzed for storage in the third storage means, a listening state in which received messages are analyzed to store the received data and prepare the control member for the function of transmission is the event a received message is addressed to the station in question, a maintenance state in which the status control means exercises its third function of scanning the third storage means to select another receiving station and a data state in which the message of the first format is sent and eventually re-sent in the event of any transmission error or of nonresponse;

The invention also relates to a characteristic procedure, explained hereafter, which specifies all the linkages of messages necessary for the operation of the system.

Briefly, the characteristic procedure of the invention, in its broadest concept comprises the steps of preparing messages in at least two different formats to be sent one at a time by one of a group of stations linked by a common communication channel, each being a message being sent essentially simultaneously to all other stations at a rate within a predetermined tolerance of a predetermined rate, these two formats both being preceded by a synchronization signal that identifies the beginning of the message and including thereafter a contact code specific to the format that indicates to all stations the active status of the sending station as well as the format of the message, a source address code that identifies unambiguously the sending station and a destination address code that points unambiguously to one other station. The first format includes, after the previously mentioned elements, a data field and the destination address code that serves to point unambiguously to a station which should accept the data field and then send the next message within a fixed maximum delay. The second message format does not include a data field and the destination address code serves to point unambiguously to one station which should then send the next message within the same maximum delay just referred to; the next step is that the station pointed to by the destination address code sends the next message within the aforesaid fixed maximum delay, such next message being, if data is pending for transmission, a message of the first format including these data and the related destination address code and, if no data is pending for transmission, being a message of the second format including a destination address code that points to the next station according to a predetermined looped list order of stations existing in the group which is provided to all of these stations beforehand.

The above-mentioned broad concept can be further particularized by including the step of preparing messages in a third format which is like the second, except that the control code indicates to all stations the end of activity of the sending station, as well as identifying the format and also by providing that the step of sending the next message includes, for the station selected by the destination address code, if a local end-of-activity condition has been established, as by an inactivating switch or a breakdown of the station, sending a message of this third format, including a destination address code that points to the next station according to the common looped list. A still further refinement of the procedure of the present invention provides for the step of sending messages of a fourth format, preceded like the other messages, by a synchronization signal that identifies the beginning of the message and consisting only of a specific control code that indicates to the previously sending station the need of sending again the previously transmitted message and providing also for the step of detecting whether error exists in a received data field and further in which the step of sending the next message includes (1) for the station selected by the destination address code, if the previous message was a message of the first format and if an error in the related data field has been detected, sending a message of the fourth format thus asking to the station that sent the previous message to repeat it, and (2) for the station which has sent the previous message of the first format and that receives the message of the fourth format, the repetition of the message, and (3) for all stations that are not selected and that have not sent the previous message, ignoring any message of the fourth format. Further refinements of the procedure and described in the detailed description below and are specified in the claims.

The invention renders it possible to constitute communication networks for automatic information, in the applications of administrative and accounting management, of sale, of industrial control, of instrumentation, of telenetering, of telesignalling or in any combination of such applications.

BRIEF DESCRIPTION OF THE DRAWINGS

The invention also relates to other features and the following description, given with reference to the accompanying drawings, will make the invention better understood in all its features. In these drawings:

FIG. 13 is a simplified flow diagram which shows the typical behavior of a utilization member with respect to the communication control member described by way of example.

GENERAL DESCRIPTION OF THE PREFERRED SYSTEM

According to the first fundamental feature of the invention, the various types of message liable to circulate over the transmission means are represented exclusively by one or the other of a minimum number of four models of message. For this purpose, the procedure is an explained hereinafter.

The control members of the respective stations cause to circulate, over the transmission channel trains of modulated bits, which are logically grouped in characters which each comprise an equal number of bits. For an embodiment of the invention in which the number N of bits is required as to define a character, the $2^N$ different combinations of bits which are possible form a single character code, in which a certain number of particular combinations of bits are selected:

four different combinations termed respectively DON, ENT, FIN and NEG like the models of message to which they correspond, are designed to be function characters;

according to the number of stations provided in the network, and the maximum of which is $2^N$ for a single-character address, an equal number of different combinations are selected, each to be the identification or the address peculiar to a given station.

Figure 1:
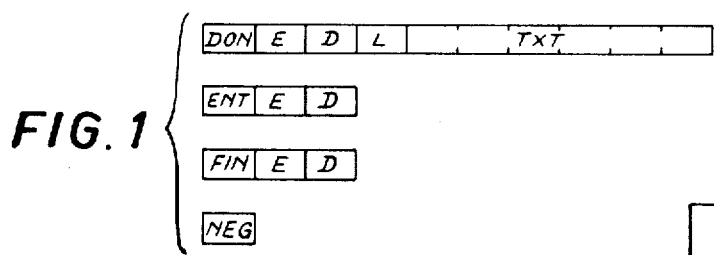
FIG. 1 represents the four models of messages used according to the invention.

According to the invention, the stations transmit messages, that is to say trains of consecutively transmitted characters and these messages are of four types, the composition of which is illustrated in FIG. 1.

The messages DON, or messages of model DON for the transmission of data comprise, in the order of transmission or reception:

the character DON which identifies them as such, the character E which is the address of the station which is transmitting the message, the character D which is the address of the station which is to receive the message, the character L which specifies the length or number of characters in the TXT portion which follows, the character train TXT which carries the data sent by the utilization member of the transmitting station for the benefit of the utilization member of the receiving station, the length character L and the character train TXT together constituting the actual text.

The messages ENT or messages of model ENT for the maintenance of the operation of the system, comprise, in order:

the character ENT which identifies them as such, the character E, address of the transmitting station, the character D, address of the receiving station.

The messages FIN or messages of model FIN for the maintenance of operation of the system then for cessation of communication differ from the messages ENT only in the first character FIN.

The messages NEG or messages of model NEG for negative acknowledgement of reception comprise only the character NEG.

The fundamental rules for the linking of these messages over the connecting channel which constitute the actual procedure are given hereafter. The adherence to these rules is ensured by the adequate means with which the control members of the various stations are equipped, all of which are provided with an identical automatic logic by construction.

Figure 2:
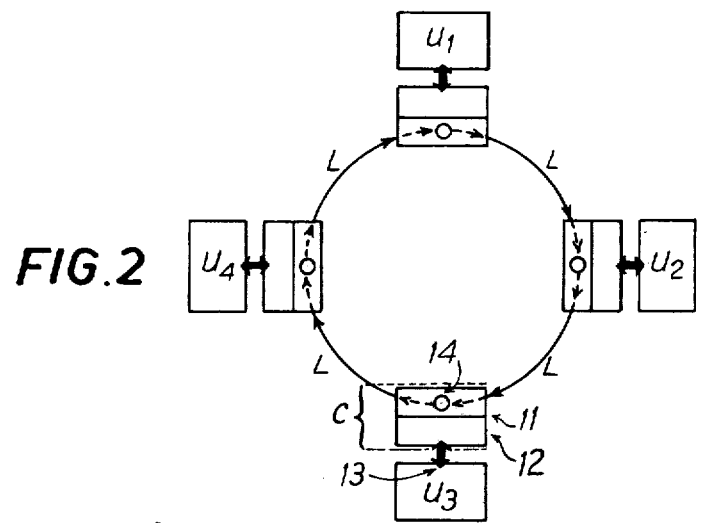
FIG. 2 illustrates, very diagrammatically, by way of specific example, a transmission system according to the invention with four stations.

For a better understanding of the explanation of the invention, a simplified network of four stations, as illustrated in FIG. 2, will now be considered by way of example. In such a network, each of the stations is physically connected to the next station, in this illustration example, by a line L of the telephone type, unidirectional transmission being effected in the synchronous binary mode.

Each station is equipped with an identical control member C, operating according to the invention. The utilization members U1, U2 U3 and U4 communicate through the intermediary of the control members C and of the connections L.

The control member C comprises a coupling device 11, a logic device 12, an interface 13 and a transparency device 14 which is comprised in the coupling device 11.

When a given station is the course of reception, or is inactive, the signals received from the incoming line L are retransmitted by its transparency device 14, which is the reason for calling the device 14 a transparency device; when this station is transmitting, its transparency device is inhibited by the logic member 12 in such a manner that it does not retransmit.

At a given moment, and in accordance with the procedure operated according to the invention, only one of the stations is transmitting while all the other stations are receiving: it follows that the signals are retransmitted over all the lines L by means of the transparency devices 14 of the receiving stations. Thus, any message transmitted will be received by all the receiving stations. The transparency devices are necessitated by the wire line connecting the stations in a chain, since all stations must be able to receive all messages.

In the control members C, the coupling device 11 enables the logic device 12 to receive the messages originating from the incoming line L, after conversion into a suitable form. Conversely, the messages prepared by the logic device 12 are converted according to the mode of transmission by the coupling device 11, then transmitted over the outgoing line L.

The interface 13 ensures the circulation of the transmitted or received texts, and of the various instructions, orders and information regarding state as necessary between the utilization member and the logic device 12.

Figure 3:
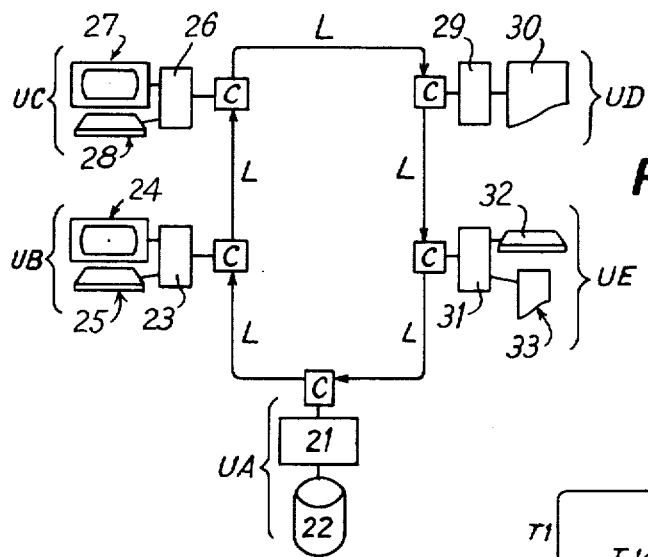
FIG. 3 illustrates very diagrammatically, by way of another specific example, the practical application of the invention to the management of a commercial enterprise, in the case of a system comprising five stations.

In order to define the practical use of such a network in the management of a commercial enterprise, let us consider the network illustrated in FIG. 3. This network comprises five stations all equipped with a control member C according to the invention, of the kind of that described in the previous example.

The utilization member UA is composed of a small computer 21, which is provided with a magnetic disc of high capacity 22 as an external store.

The utilization member UB is composed of a small programmable unit 23, a display screen 24 and a keyboard 25.

The utilization member UC is composed of a small programmable unit 26, a display screen 27 and a keyboard 28.

The utilization member UD is composed of a small programmable unit 29 and a printing unit 30.

The utilization member UE is an electronic invoicing device composed of a small programmable unit 31, a keyboard 32 and a printing unit 33.

The purpose of the station UA is to manage automatically, through the programs of the computer 21, an assembly of files recorded on the disc store 22 as series of items. The programs of the computer 21 enable any other station in the network, which transmits order texts in a suitable form, to have access to said files for any operation of research, of creation or of modification of an item. Every operation of this kind gives rise to a reply text transmitted towards the corresponding station.

The purpose of the station UB is to manage the customers' orders. The operator of the station UB, being in telephone communication with a customer, interrogates the station UA by entering instructions through the keyboard 25, which are converted and transmitted with the aid of the program of the unit 23. By this means, he receives information regarding the customer, regarding the stocks and regarding the prices of the goods, which are displayed by the program of the unit 23 on the screen 24. The operator can then converse with the customer and record the quantities as they are ordered; the latter are returned to an order file of the unit UA, with the customer's reference number.

The operator of the station UC is charged with valuing the orders before the goods are delivered and invoiced. The station UC, equipped in a similar manner to the station UB, enables him to interrogate the outstanding order file, to value each order and to record it afresh in a file of the orders to be fulfilled.

The station UD, situated in a warehouse, comprises a program in the unit 29 which interrogates the file of orders to be fulfilled, then edits the corresponding delivery order and causes it to be printed on the unit 30.

The invoicing station UE, actuated by the program of the unit 31 which accords with the instructions of the operator, entered on the keyboard 32, interrogates the order file, edits the invoices and prints them on the unit 33.

The example described above illustrates the possibility which is afforded by a communication network according to the invention, to split up a practical application into as many autonomous stations as necessary and each of which is provided with a specialized program. Thus, each station is equipped with the most suitable members depending on its particular purpose, which is an important factor in optimizing the costs.

On the other hand the introduction of fresh stations, having a different purpose, can be effected without having to modify the other stations in any way. For example, in the network of the above example, it is possible to insert a fresh station similar to UB or to UC, intended for the interrogation of the files of UA by the management of the enterprise, or any number stations identical to the stations already described, depending on the volume of work to be carried out or on the admissible time of response.

OPERATION OF THE SYSTEM

The detailed functional description of a message transmission system according to the invention will now be given.

Each station in the network is either active, which means that it is adapted to transmit and receive messages, or inactive, which means that it is not transmitting or receiving messages at this moment. Nevertheless, if necessary, an inactive station fulfils a transparency function which enables the other stations to receive all the messages circulating over the connections.

When the network and its various stations are installed or taken into service, the addresses of the various stations are arranged logically in accordance with a circular list and reference is made to this list hereinafter. In particular, the notion of a following station, used hereinafter, refers to this order. A circular list is understood to mean a closed-loop list so that, when it is consulted, it has neither beginning nor end.

At each moment, one and only one of the active stations of the network is transmitting and all the other active stations of the network in condition for reception. For the purpose of explaining the system procedure, the active station which is transmitting at a given moment is said to be privileged.

When a station is privileged, the control member of this station transmits one of the messages DON, ENT or FIN, according to the state of the station at this moment. In these messages, the address of the transmitting station will be that of the privileged station and the selection from the three models of message is made depending on the requests submitted by the utilization member of the same station.

If this utilization member submits a data text, applying for its transmission, its destination being one of the other active stations, a message DON is composed by the control member, with the address of this recipient and the text as submitted, and this message is transmitted immediately.

If the utilization member is continuing its own work but does not submit any text for transmission for which the recipient is another station which is active at this moment, the control member composes a message ENT, the recipient for which is the first following station (on the above-mentioned list) which is active at this moment, or an inactive station which the control is trying to activate if this is possible by a process explained below. Then, this message is transmitted immediately.

If the utilization member is in the condition of end of work, which implies the cessation of communication for the privileged station, the control member composes a messange FIN, the selection of the recipient being effected as for a message ENT.

A message FIN signals to all the other stations which are active at the moment when it is circulating that the transmitting station is ceasing to communicate, that is to say it is becoming inactive for an indefinite period as soon as another station has become privileged.

In the procedure according to the invention and if the message is any one of these three models (message DON, ENT or FIN), the transmitting station loses the privilege to transmit in favour of the receiving station, unless the latter, in turn, does not transmit any message within a predetermined time.

The connecting channel may introduce errors of transmission physically, such as a certain number of bits being mutilated in the messages. Some of these errors, such as the mutilation of the function characters or of the address characters, are recognized specifically by the control members. Actually, the use, according to the invention, of the limited number of four models of message, in which there is no ambiguity in the interpretation of each character, enables the natural redundancy of the characters at the beginning of a message to be used in an optimum manner with a view to detecting errors relating to these characters.

Moreover, the control members may be equipped with any known means for detecting errors at the physical level. Finally, the use of certain bits of the text, in the messages DON, as redundancy checking information, may enable such errors to be detected.

The control members of the invention are therefore provided with any combination of such error-detecting means, in order to ensure the reliability of the communications.

Afer the circulation of a complete message of the type DON, ENT or FIN, over the connecting channel, the normal sequence consists:

for the ex-transmitting station, in disposing itself in the active or inactive position if it has just transmitted a message FIN, for the stations which were not recipients of said message, in remaining in the active position to receive the subsequent messages, for the station which was the recipient of said message and which has therefore become privileged, in effecting in turn the selection between the three possibilities of message transmission DON, ENT or FIN, as explained above, and so on.

If the recipient station has not detected any error in transmission, it therefore transmits such a message immediately, and the circulation of the latter over the connecting channel will be regarded by the ex-transmitting station as an indication of a transmission correctly achieved, which constitutes a positive and implicit acknowledgement of reception according to an inherent characteristic of operation of a transmission system according to the invention.

For temporary reasons, such as the momentary interruption of a connection, for example, of for prolonged reasons, such as the accidental stoppage of operation of a station for lack of energy, the station which is the recipient of a message may remain without transmitting although a message has been addressed thereto. It is then said that there is a condition of non-response.

On the other hand, if the station which is the recipient of the message detects an error in transmission in the text of a message DON, although the first three characters of this have been recognized as valid, its control member will decide to transmit a message NEG and will resume reception. The message NEG constitutes a negative and explicit acknowledgement of reception, and in this eventuality the station which transmitted the message thus refused will retransmit this same message DON (repeat operation), unless the message in question has already formed the subject of a number of successive repeats equal to a previously defined maximum, depending on the requirements peculiar to the application envisaged, and incidentally variable.

In the case where the message received does not comprise a recipient's address character which can be recognized without ambiguity, no active receiving station transmits a message in turn, and a condition of non-response follows. Such a condition of non-response is recognized by the ex-transmitting station, then receiving, by means of any time-measuring means, a given time being started at the end of the transmission.

As soon as a condition of non-response is detected, the ex-transmitting station makes a fresh attempt at transmission of the message which had no result, which constitutes another repeat operation.

In every case, the repeat process is limited to a given number of times (re-transmission of the same message). Beyond this number of repetitions, the control member of the transmitting station, which in any case has become privileged as a result, reaches a decision with regard to the recipient station.

If the repeated conditions is a non-response, the recipient station will be noted by the control member which has just transmitted as inactive. If the repeated condition is the refusal of the text of a message DON by a mesage NEG, the recipient station remains noted as active. If the message, the transmission of which has thus failed, is a message DON, the utilization member is also notified of this failure and receives the information regarding the activity of the recipient of said message so that it can make its own arrangements with regard to further action.

In every case of failure of the repetition, a fresh recipient station is immediately sought in the previously prepared list, a corresponding message ENT or FIN is composed according to the indication of the end of work of the utilization member, then transmitted, and what follows is in accordance with the processes already described.

According to the invention, each control member has means for storing the information which enable it to note, to preserve and to consult all the useful information regarding the state of the network and of the communications.

In particular, these storage means include a table of information about the stations of the network, arranged circularly according to the addresses in agreement with the previously prepared list; for each station, provided in the network, this table indicates whether it exists, that is to say whether it is effectively installed in the network, and whether it is active or not.

INTERNAL STATES OF A STATION

According to the invention, each control member is provided with means respectively sensitive exclusively to the models of message DON, ENT, FIN and NEG to bring this control member exclusively into one or the other of the following five internal states defining the behaviour of the station to which this control member belongs wth respect to the other stations.

The PASSIVE state of a control member of a station is that in which this control member does not play any part in the exchange of messages so long as the utilization member associated therewith does not indicate a starting condition.

The BEGINNING state of a control member of a station is that in which this control member effects exclusively reception operations, before passing to full activity to which the following states correspond.

The LISTENING state of a control member of a station corresponds to a station which is not privileged and is not waiting for an acknowledgement of reception for a preceding transmission. In this state, the control member receives all the message circulating and possibly transmits negative acknowledgements of reception (message NEG) for erroneous texts which are destined for its station.

The MAINTANANCE state of a control member of a station corresponds to a station which is privileged but which does not have a text applying for transmission. The control member then composes messages ENT or FIN and ensures possible repeats of these messages.

The DATA state of a control member of a station corresponds to a station which is privileged and for which a text is applying for transmission. The control member then ensures the transmission of the appropriate message DON, and possibly the necessary repeats of this message.

The following synoptic table summarizes the possible states in which a station may be and the corresponding possible states of the control member associated with this station.

| Possible states of the control member | Possible states of the associated station |
| --- | --- |
| PASSIVE or BEGINNING | INACTIVE |
| LISTENING or MAINTENANCE or DATA | ACTIVE or PRIVILEGED |

Figure 4:
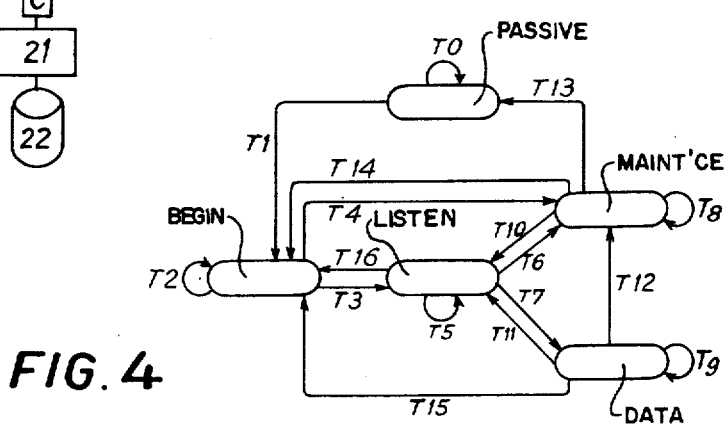
FIG. 4 illustrates by a flow chart all the possible transitions between the various internal states of a control member during its operation.

In the procedure according to the invention, the behaviour of a control member can be described with the aid of the flow diagram of FIG. 4. The control member may be in one of the five internal states determining the sequences of the messages by its automatic operation. Each arrow in this flow diagram corresponds to a transition from one state of the control member to a fresh state.

TRANSITIONS BETWEEN STATES (FIG. 4)

A detailed explanation of these transitions will be found below, specifying the behaviour of each station, particularly in certain particular circumstances which have not yet been described: single station active at a given moment, attempt to re-activate stations hitherto inactive.

In the transition T0:

In the absence of an order to communicate, originating from the utilization member, the control member continuously regenerates its functional sub-assemblies in their initial state and remains in the PASSIVE state.

In the transition T1:

The utilization member gives the order to commence communication and the control member switches into the BEGINNING state. At this moment, the contents of its table define all the other stations as inactive.

In the transition T2:

In order to learn the state of the network (following on the transition T1) or to have confirmation thereof (following on an error which has led to one of the transitions T14, T15 or T16 described below), the messages which are circulating over the connecting channels are received and analyzed by the control member. If messages are circulating effectively, the control member ignores the messages NEG while it exploits the messages ENT, FIN or DON, the first three characters of which are recognized as valid; the control member then notes that the transmitting station is active (message ENT of DON) of inactive (message FIN). The operation is repeated as long as a given number of messages, the first three characters of which are valid, have not been analyzed consecutively.

In the transition T3:

After completion of the operation of analyzing a given number of messages, as described for the transition T2, the control member switches into the LISTENING state.

In the transition T4:

With the aid of any time-measuring means, the control member detects the prolonged absence of messages over the connections. In the procedure according to the invention, this signifies that no other station in the network is active at this moment; the station is active alone, and its control member passes into the MAINTENANCE state to ensure the commencement of communication to the propitious moment.

In the transition T5:

In the LISTENING state, the control member of the station, not then privileged, adapts itself for reception. The messages received are analyzed; the messages NEG are ignored; the other messages, the first three characters of which are not recognized as valid, form the subject of the transition T16 described below. The only messages which give rise to an action are those:

of which the first character is DON, ENT or FIN, of which the transmitter address corresponds to an existing station other than that of the control member under consideration, of which the recipient's address corresponds to an existing station.

If these conditions are fulfilled, the table is brought up to date according to the function character: the transmitting station is noted as active for the messages DON or ENT, inactive for the message FIN. If the message received is not intended for the control member under consideration, this remains in the LISTENING state after the end of the message. IF the message received is a message DON, of which the first three characters were correct, and which was addressed to the station in question but for which an error may have been detected in the text, the control transmits a message NEG and remains in the LISTENING state; the same applies if the utilizer signals that it cannot accept it for any reason.

In the transition T6:

The passage from the LISTENING state to the MAINTENANCE state is effected when one or the other of the following two conditions applies:

the control member recognizes that its station alone remains active in the network, by detecting, with the aid of any time-measuring means, the prolonged absence of messages circulating over the connections;

the control member recognizes that the recipient's address of a message ENT, FIN or DON, which is entirely correct is identical to its own, and, as the same moment, the utilization member is not submitting any text which is applying for transmission.

If it is the second of these conditions which is verified, and the message received is a message DON, the text of data received is further communicated to the utilization member, accompanied by the address of the station which has transmitted said text.

In the transition T7:

The passage from the LISTENING state to the DATA state is determined by the satisfactory reception of a message ENT, FIN or DON, and when the control member recognizes a recipient's address identical to its own, and the presence, at the same moment, of a text applying for transmission, submitted by the utilization member.

In the transition T8:

In the MAINTENANCE state, the control member consults the table of information regarding the state of the stations (already mentioned above), in order, and from the position corresponding to the first following station.

As a general rule, this consultation stops at the first following station noted as active.

Nevertheless, in order that stations hitherto noted as inactive in the table may also be recipients, and so become active if they are ready, the procedure is as follows:

the control associates a given time (or re-activation time) with the stations of the network which are noted as being inactive. The passage of this time is recognized with the aid of any time-measuring means, and the associated stations are then said to be eligible;

the selection of the recipient stops at the first following station which is noted as existent, active or eligible.

The given time allocated to the stations noted as being inactive may, according to a first mode of operation, be allocated collectively with a single identical value, for all the inactive stations whatever the value of the preceding period of inactivity of each.

According to this first mode of operation, a message ENT or FIN ensures two distinct functions according to the following two modes of operation:

a. it renders the first following active station privileged, during a certain period of operation of the system, and b. then it is addressed to the first following existing station; if this remains inactive, it is addressed to the following existing one etc. until an existing station is reached which becomes active or a station which is already active, after which there is a return to mode *a* above.

According to a second mode of operation, the give time allocated to the stations noted as inactive may be allocated individually to each of these inactive stations.

In the particular case where the control member recognizes that its station alone is active, all the existing stations are regarded as eligible.

This selection of the recipient station having been effected, the control member composes a suitable message ENT, unless, at this moment, the utilization member is in a condition of end of communication, in which case it is a message FIN which is formed.

The prepared message is immediately transmitted and the control member adapts itself for reception, waiting for the circulation of a message constituting a reply.

In the event of non-response from a station noted as being active, a repeat is effected by re-transmission of the same message an so on within the limit of a given number of attempts, which are counted. If this limit is exceeded, the recipient station is noted as being inactive.

In the event of non-response form a station which is simply eligible, no repetition is attempted.

In every case of non-response leading to abandonment of the selected recipient, the examination of the table continues from the following position, and a fresh station is selected as recipient.

Summing up, the control member remains in the MAINTENANCE state so long as a message of which the first character is ENT, FIN or DON, is not received following the transmission of a messge ENT of FIN and no error in reception is detected.

In the transition T9:

In the DATA state, the utilization member of the station submits a text which is applying for transmission, with the address of the station for which this text is intended.

By consulting the table of information regarding the state of the other stations, the control member verifies that the recipient exists and is noted as being active: in this case a suitable message DON is composed and transmitted, and the control member adapts itself for reception while awaiting a message constituting a reply. In the event of non-response, a process of repeats similar to what which is described for the transition T8 is carried out. If these repeats fail, the recipient station is noted as being inactive in the table.

In the case of a negative acknowledgement of reception signalled by the reception of a message NEG, a repeat is likewise effected and this may possibly be repeated a given number of times. If these repeats fail, the recipient station is nevertheless still noted as being active.

Summing up, the control member maintains the station in the DATA state so long as a message DON transmitted by it has not received an implicit positive reply (message DON, ENT or FIN) within the limits of a given number of repeats on non-response or negative acknowledgement of reception, and so long as an error in reception is not detected.

In the transition T10:

Following on the transmission of a message ENT, the control member receives a message, the first character of which is DON, ENT or FIN, which, in the procedure according to the invention constitutes a positive and implicit acknowledgement of reception; the control member then causes the station to switch into the LISTENING state for the analysis of the rest of the message.

In the transition T11:

Following on the transmission of a message DON, the station receives a message, the first character of which is DON, ENT or FIN, which constitutes a positive and implicit acknowledgement of reception. The utilization member is then notified of the end of this operation of sending a text, and of the success of this. When the control member causes the station to switch in the LISTENING state to analyze the rest of the message received.

In the transition T12:

Following the transmission of a message DON which has not been able to succeed following non-response or message NEG, despite the repeats, the utilization member is notified of the end of the operation, and of the failure thereof. In addition, the control member supplies it with the state of the recipient station (existence, activity) as it results from the operation.

In the case where the utilization member has proposed the transmission of a text to a station noted as being non-existant or non-active, no transmission is attempted and the utilization member recieves the same report as above. In both cases, the control member restores the station to the MAINTENANCE state, for the corresponding operations.

In the transition T13,

Following on the transmission of a message FIN which necessarily results from an indication of the end of activity given by the utilization member, the station receives a message, the first character of which is ENT, FIN or DON. The control member therefore switches into the PASSIVE state because this constitutes a positvie acknowledgement of reception.

The control member likewise passes into the PASSIVE state if it was in the MAINTENANCE state and has recognized that the station is the only active one in the network, while the utilization member is in the condition of end of activity.

In the transition T14:

In the case where, following on the transmission of a message ENT of FIN, the first character of the message received is not identifiable as ENT, FIN or DON, the control member returns to the BEGINNING state so as not to disturb the network so long as a series of normal receptions have not been effected.

In the transition T15:

The decision is similar to that which is taken in the transition T14, following the transmission of a message DON.

In the transition T16:

Following on the reception of a message which is not identifiable as a message NEG or as a message ENT, FIN or DON, the first three characters of which are valid, the control member switches into the BEGINNING state so as not to disturb the network so long as a series of normal receptions has not been effected.

The advantages obtained according to the invention lie, in particular, in that, in a communication system which uses the messages and the exchange procedure described above, any active station can send data to any one of the other active stations without any intermediary other than the connecting channel and the control members, any station, through the message FIN, can terminate communication at any instant without introducing perturbation into the traffic of the other stations of the network, any station can begin to participate in communication, as a result of the re-activation process ensured by all the control members, starting at any moment, without introducing any disturbance into the traffic then in existence, then local working characteristics of each station (provided by the utilization member thereof) are strictly immaterial, the number of kinds of service messages, messages ENT, FIN and NEG, is reduced to three, from which there follows a great simplicity in the management of the exchanges, no centralizing member for the connections is necessary for the control of the traffic, because it is sufficient to provide, in each station, a control member following the rules of procedure.

The result is that it is possible, for a given type of connecting channel to construct control members, the cost of which is lower than all the means necessary in the existing procedures to reach the same results; in particular, the control of the transmission does not imply the presence of any program in interconnected computers according to the process.

DETAILED DESCRIPTION OF A PREFERRED SYSTEM (FIGS. 5–12)

A specific form of embodiment of the invention will now be described by way of non-limiting example.

Figure 5:
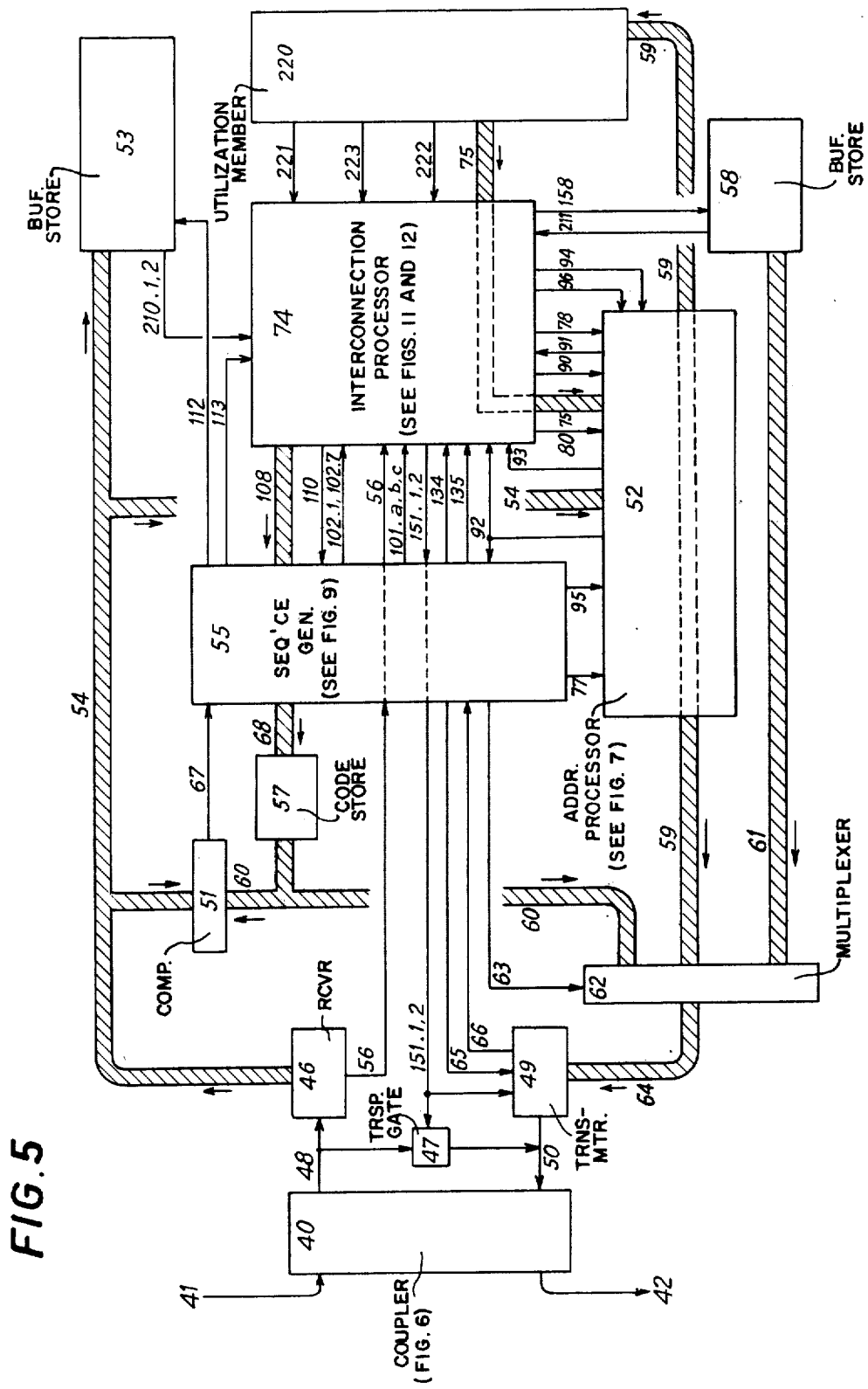
FIG. 5 is a synoptic simplified diagram of the communication control member according to the invention, and of its connections to the associated utilization member.

Reference will be made to FIG. 5 which is the general diagram of a station according to the invention, FIGS. 6 to 12 relating to detailed diagrams of certain logic assemblies of the diagram in FIG. 5. For the rest of this description, therefore, reference will always be made to FIG. 5 and also to one of the FIGS. 6 to 12.

The coupler 40 is an assembly of electronic, opto-electronic or electromechanical circuits, adapted to provide the interface between the logic members which constitute the rest of the control member, and the incoming and outgoing data transmission lines 41 and 42.

Figure 6:
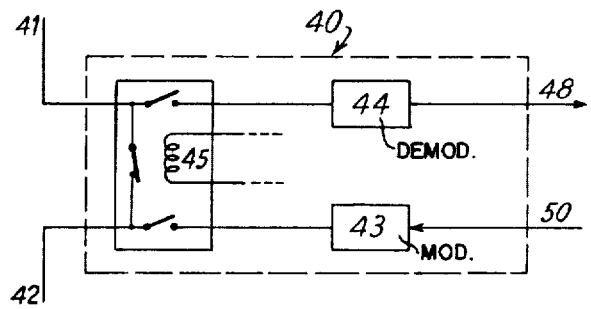
FIG. 6 is a synoptic diagram of the coupler which ensures the connection of this control member to the network.

The exact nature of these circuits depends on the nature and on the length of these lines. They comprise, as indicated in FIG. 6, a modulator 43 capable of producing signals adapted to the pass band of the transmission line 42, the destination of which is another station in the network, and a demodulator 44 capable of a interpreting the similar signals received from another station via the line 41, these two devices being adapted to operate simultaneously and in an independent manner. For transmission lines of the current telephone type, the devices 43 and 44 may consist of a device known in the art by the name of full duplex modem.

The coupler 40 further comprises a device capable of ensuring the continuity of the transmission of the signals between the lines 41 and 42 in case of difficulties, such as the accidental stoppage of the control member for lack of power, or a serious anomaly in the operation of the electronic circuits of the coupler 40 or in the other components of the control member. This device may consist, as illustrated in more detail in FIG. 6, of a two-position electromechanical relay 45 which, in the position of rest, interconnects the conductors of the lines 41 and 42, isolating them from the other members of the station, and which is fed by the same source as the other members of the coupler.

The demodulator 44 converts the singals received by the line 41 into serial logic signals, which it transmits to the receiver 46 and to the gate 47 via the connection 48. Symmetrically, the modulator 43 receives serial logic signals from the transmitter 49 and the gate 47 via the connection 50.

The receiver 46 interprets and converts into the form of characters the logic signals received from the coupler 40 via the connection 48 and in order to do this detects the synchronisation signals contained among said logic signals. The characters thus obtained are submitted is parallel form to the comparator 51, to the addressing processor 52 and to the buffer store 53, via the connection 54. Simultaneously, a time reference signal or "character present"is transmitted to the sequence generator 55 via the connection 50.

The information in the messages to be transmitted originates, in the form of characters, from the addressing processor 52, from the code store 57 and from the buffer store 58, respectively via the connections 59, 60 and 61, which end at the multiplexer 62. The latter ensures the selection of one of these sources of information, in accordance with an instruction received from the sequence generator 55 via the connection 63, and submits the corresponding information to the transmitter 49 via the connection 64.

The transmitter 49 comprises all the circuits necessary for the conversion of the characters of a message into logic signals, in serial mode, with the insertion of synchronisation signals and, possibly, of error detection-aid signals. Said transmitter 49 receives a control signal from the sequence 55 via the connection 65 and supplies it with a signal called "state ready for transmission" via the connection 66.

The comparator 51 is formed from an assembly of logic circuits capable of effecting a simple comparison "equal/different" between the characters leaving the receiver 46 via the connection 54 and the code store 57 via the connection 60. The result of this comparison is submitted to the sequence generator 55 via the connection 67.

The code store 57 is a read-only store, each location of which contains the binary representation of one of the function characters (ENT, FIN, DON, NEG) or of the address character of the station under consideration. The locations of this store are selected by the sequence generator 55 via the connection 68. The character thus selected is submitted, via the connection 60, to the comparator 51 and to the multiplexer 62.

Figure 7:
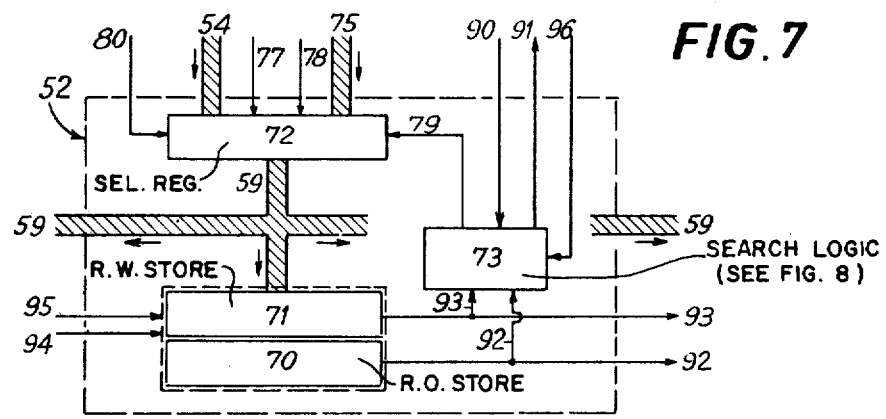
FIG. 7 is a simplified synoptic diagram of the addressing operator comprising the table of information regarding the state of the network, as well as the access logic to this table.

The addressing processor 52, illustrated in more detail in FIG. 7, comprises essentially the read-only store 70, the read-write store 71, and the search logic 73. The stores 70 and 71 constitute the table of the state of the network, the read-only store 70 containing the bits representing the existence of the stations, and the read-write store 71 containing the bits representing the activity of these stations. These two stores each comprise $2^N$ locations of one bit, where N is the number of bits in the characters transmitted.

These two stores 70 and 71 are addressed by the selection register 72, by means of the connection 59, this connection submitting this same address to the multiplexer 62 and to the utilization member 220. The selection register 72 has two parallel inputs, connected the one to the receiver 46 via the connection 54 and the other to the state processor 74 via the connection 75.

The writing in the selection register 72 from one of these two sources is controlled respectively by the sequence generator 55 and by the state processor 74 by means of the connections 77 and 78. In addition, said selection register 72 comprises a progession circuit rendering it possible to obtain, step by step, a sequence of states of said register comprising as a sub-assembly the arranged list of the addresses of the stations and which may be indentical therewith. This progression is controlled by the search logic 73, via the connection 79. Finally, a connection 80 enables the register 72 to be restored to the stated corrresponding to the actual address of the station under consideration.

Figure 8:
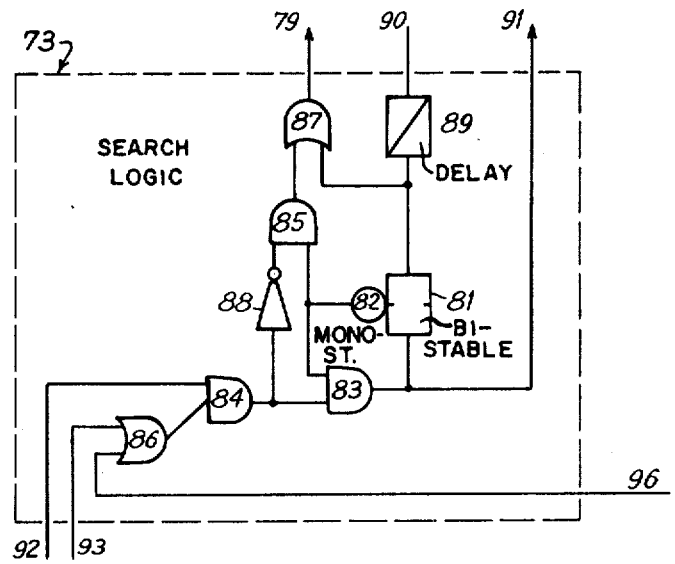
FIG. 8 is a diagram of the search logic in said table.

The search logic 73, illustrated in FIG. 8, comprises a toggle (bistable) circuit 81, an astable circuit (a circuit sometimes called a "monostable" circuit), three logic AND circuits 83, 84 and 85, two OR circuits 86 and 87, and a negater 88. The search logic 73 receives a control signal from the interconnection processor 74 via a delay element 89 via the connection 90, and supplies this processor 74 with an "end of search" signal via the connection 91. On the other hand, the search logic 73 uses the output states presented by the stores 70 and 71 over two connections 92 (existence) and 93 (activity). Furthermore, the state of existence is submitted to the sequence generator 55 and to the state processor 74 via the connection 92, and the state of activity to the state processor 74 via the connection 93.

The connections 94 and 95 enable the contents of the store 71 to be modified. The connection 96 transmits, to the search logic 73, the "re-activation" signal originating from the state processor 74.

Figure 9:
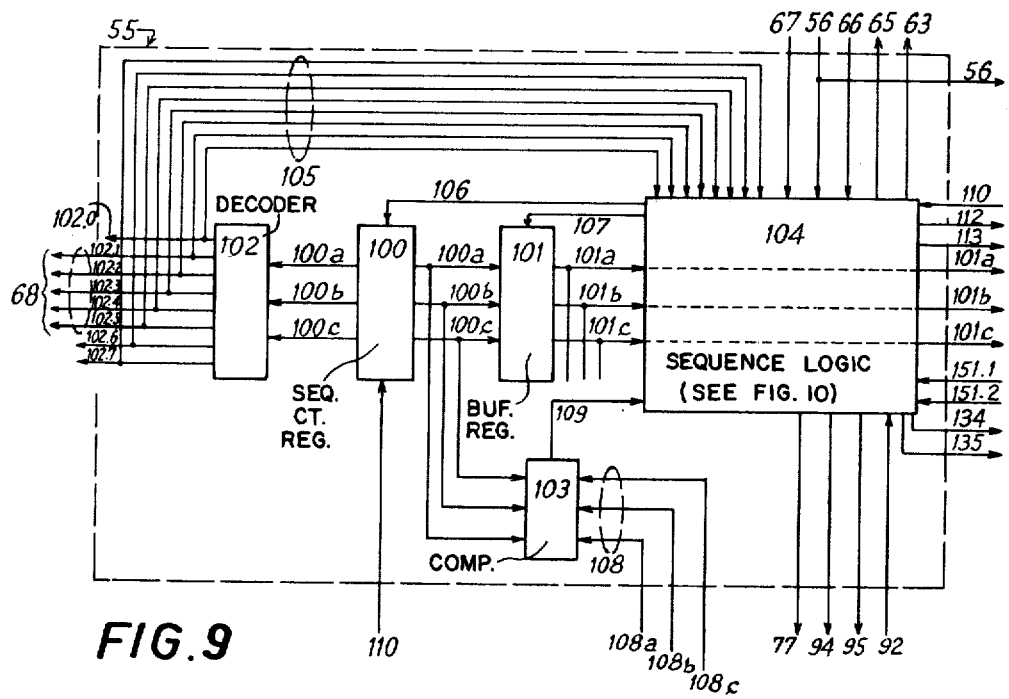
FIG. 9 is a simplified synoptic diagram of the generator of the sequence of transmission and reception of the messages.

The sequence generator 55, illustrated in more detail in FIG. 9, comprises a sequence counting register of sequence register 100, a buffer register 101, a decoder 102, a comparator 103 and a sequence logic 104. The sequence register 100 is a three-stage binary counter, of which the outputs 100a, 100b and 100c are connected to the inputs of the buffer register 101, of the decoder 102 and to one of the inputs or the comparator 103.

The outpts 101a, 101b and 101c of the buffer register 101 are connected both to the sequence logic 104 and to the state processor 74 (FIG. 5). The decoder 102 has eight outputs bearing the reference numbers 102.0 to 102.7 of which the outputs 102.1 to 102.5 form the connection 68 which is directed towards the code store 57. The outputs 102.0, 102.1, 102.4 to 102.7 are used by the sequence logic 104 thus forming the connection 105.

The progression of the sequence register 100 is controlled by the sequence logic 104 via the connection 106, while the writing in the buffer register 101 is controlled by the connection 107. The comparator 103 receives the ouput 100l, 100b and 100c of the sequence register 100 and an item of information regarding state from the state processor 74 via a connection 108 which likewise has three signals 108l, 108b and 108c. The result of the comparison of these two groups of three signals is submitted to the sequence logic 104 via the connection 109.

The sequence register 100 can be reset to zero by a signal originating from the state processor 74 via the connection 110.

Figure 10:
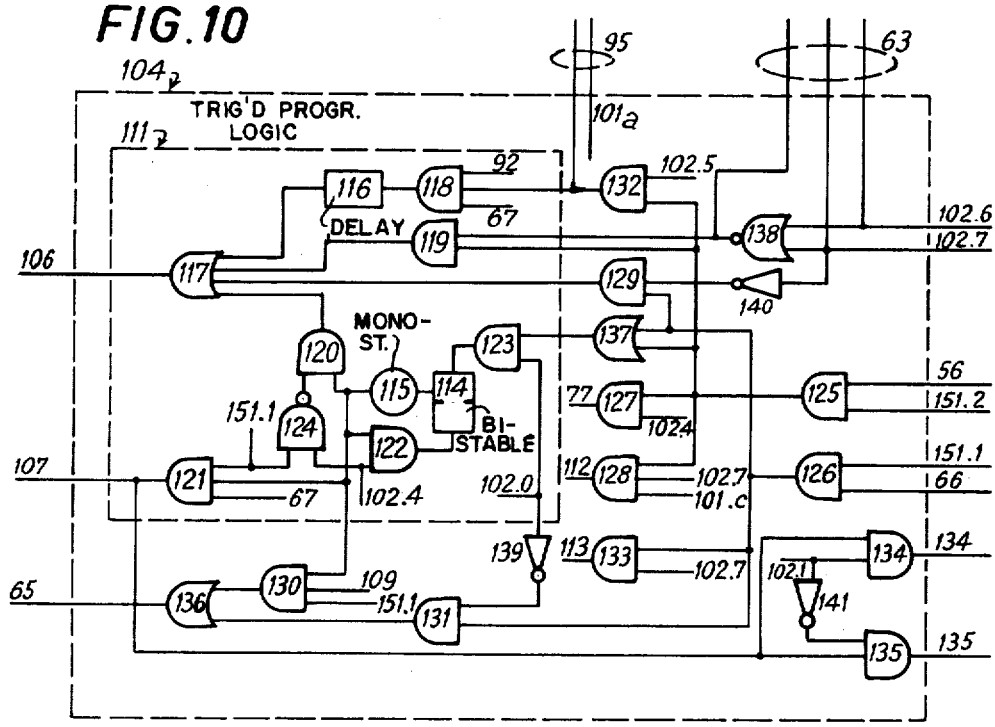
FIG. 10 is a simplified synoptic diagram of the sequence logic which actuates the sequence generator.

The sequence logic 104, illustrated in more detail in FIG. 10, prepares the control signals for the registers 100 and 101, the selection register 72, the transmitter 49, the multiplexer 62, the buffer stores 53 and 58 and the read-write store 72. It receives information regarding state from the receiver 46, the transmitter 49, the comparator 51, the stores 70 and 71, the state processor 74, the sequence register 100, the buffer register 101, the decoder 102 and the comparator 103.

The sequence logic 104 consists essentially of a triggered progression 111, similar to that already described in the search logic 73, which produces the "progression" signal of the sequence register 100 over the connection 106 and the "writing" signal of the buffer store 101 over the connection 107, and of a certain number of logic circuits which produce the control signals transmitted over the connections 63, 65, 77, 95, that transmitted over the connection 112 to control the arrangement in the buffer store 53 of the characters of text received, present on the connection 54, and that transmitted over the connection 113 to control the output of the characters contained in the buffer store 58.

The progression logic 111, illustrated inside a box in broken lines inside FIG. 10, comprises a toggle circuit 114, an astable circuit 115, a delay element 116, a logical OR circuit 117, six logical AND circuits 118, 119 120, 121, 122, 123, and a logical NOT-AND circuit 124. The other logic circuts comprise ten AND circuits numbered 125 to 135, two logical OR circuits 136 and 137, and a logical NOR circuit (NOT-OR) 138, and the three negaters 139, 140 and 141.

Figure 11:
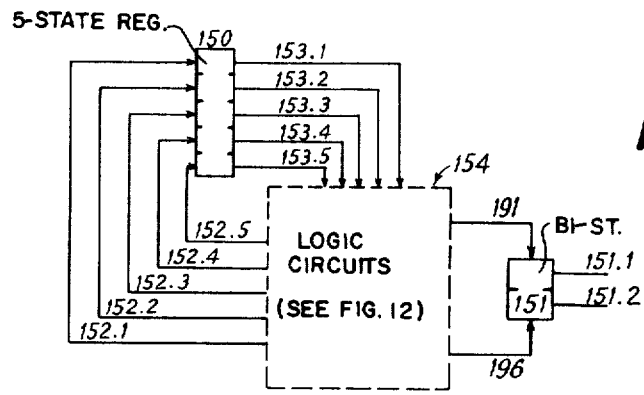
FIG. 11 is a diagram summarizing the relations of the internal state register of the control member with the rest of the linkage logic.
Figure 12:
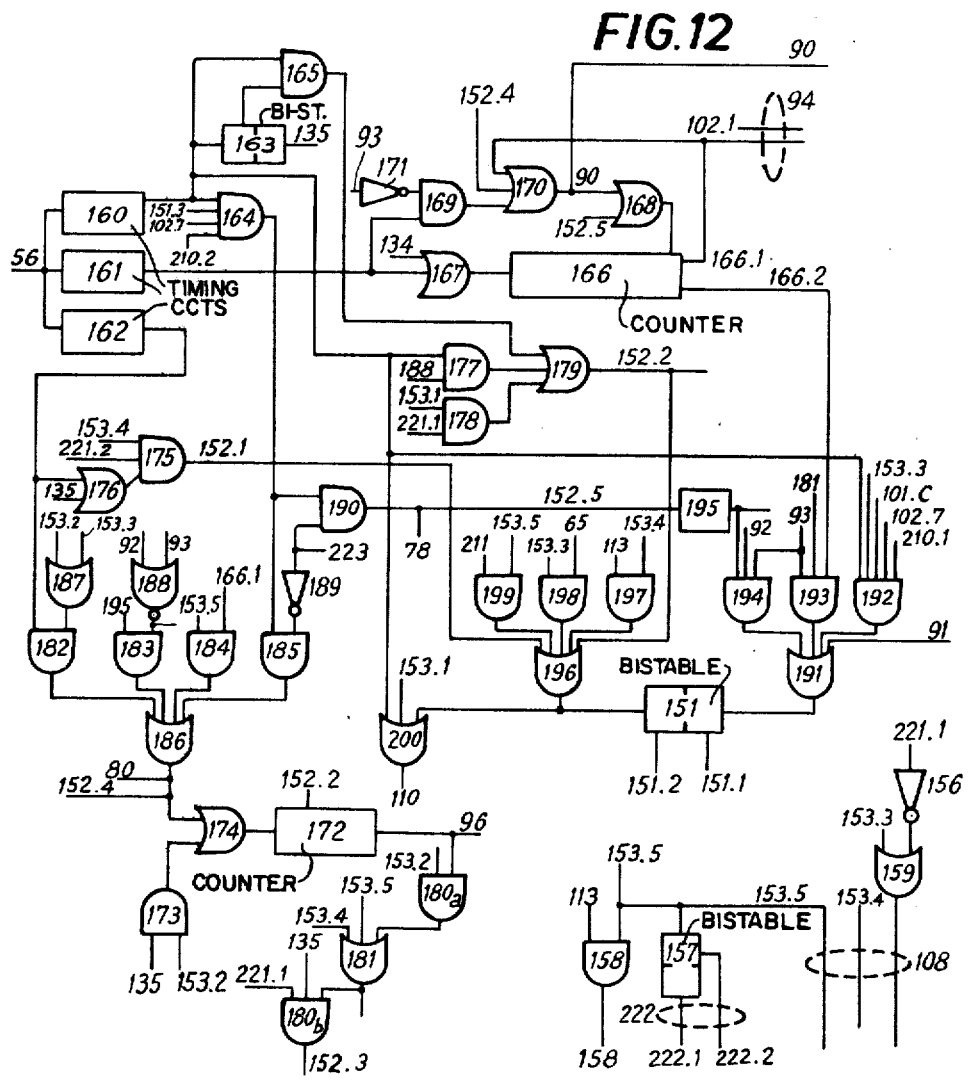
FIG. 12 illustrates in detal these logic circuits and their operators.

The state processor 74, illustrated in more detail in FIGS. 11 and 12, comprises all the logic elements necessary for the interconnection of the seqences of actions executed by the transmission, analysis and message composition operators, and defined by the sequence generator 55. Said state processor 74 likewise provides the connection between the execution processors and the utilization member 220.

The state processor 74 first comprises the registers defining the internal state of the communication control member, namely a five-state state register 150 and a toggle circuit 151. the five states of the register 150 correspond to the five state defined above for the control member: PASSIVE, BEGINNING, LISTENING, MAINTENANCE and DATA. The structure of this state register 150 depends essentially on the technology used but here it is simply assumed that it has five inputs numbered 152.1 to 152.5 which receive the signals for positioning the state register 150 in these five states, and five state outputs numbered 153.1 to 153.5 which deliver signals in a "one out of five" code. The toggle circuit 151 represents the nature of the sequence in the course of execution, namely reception or transmission.

The state processor 74 likewise comprises an assembly of logic circuits 154 which produce the control signals for the state register 150 and the toggle circuit 151. These circuits use the state and event signals supplied by the other operators composing the control member, and a certain number of state and event signals produced in the state processor 74 itself by particular timing elements, namely an end of message circuit, and repeat and re-activation counters.

Finally, the interconnection logic comprises four auxiliary circuits which produce instructions intended for the other members of the control member: a negater 165, a toggle circuit 157, a logical AND circuit 158 and a logical OR circuit 159.

The end of message circuit first comprises three timing circuits 160, 161 and 162, all re-set by the "character present" signal transmitted over the connection 56 and regulated to increasing times; they deliver respectively the "end of message", "non-response" and "absence of message" signals. It likewise comprises a logical AND circuit 164 supplying the "message accepted" signal, a toggle circuit 163 and a logical AND circuit 165 supplying an error signal.

The repeat counter comprises a counter 166, three logical OR circuits 167, 168 and 170, a logical AND circuit 169 and a negater 171. The counter 166 has two outputs: 166.1 which is active at the end of a cycle and 166.2 which is active in all its other states. With the connection 102.1, the output 166.1 forms the connection 94 towards the addressing processor 52. The logical OR circuits 167 and 168 serve as input and resetting circuits for this same repeat counter 166.

The re-activation counter comprises a counter 172, a logical input OR circuit 174, a reset input connected to 152.2 and an output 96 which is in the TRUE state for the last state of its cycle; a logical AND circuit 173 produces one of the input signals for the counter 172.

The circuit for bringing the state register 150 into the PASSIVE state comprises a logical AND circuit 175 and a logical OR circuit 176. Its output is the signal transmitted over the connection 152.1. The circuit for bringing the same state register 150 into the BEGINNING state comprises two logical AND circuits 177 and 178 and a logical OR circuit 179, the output of which is the signal transmitted over the connection 152.2, which likewise resets the re-activation counter 172. The circuit for bringing the register 150 into the LISTENING state produces the signal transmitted over the connection 152.3 by means of the logical AND circuits 180a and 180b, and the logical OR circuit 181. The circuit for bringing the register 150 into the MAINTENANCE state comprises the logical AND circuits 181 to 185, the logical OR circuits 186 and 187, the logical NOR circuit 188 and the negater 189. Its output is connected to the connections 80 and 152.4 and to one of the inputs of the re-activation counter 172. The circuit for bringing the register 150 into the DATA state is formed by a simple logical AND circuit 190 supplying the signal transmitted over the connection 152.5 which is likewise used for the resetting of the repeat counter 166 and, through the connection 78, for writing in the selection register 72.

The control circuits for the toggle 151 number two, for bringing into the transmission state and for bringing into the reception state respectively. The first comprises a logical OR circuit 191, three logical AND circuits 192 to 194 and a delay element 195 receiving the signal for bringing into the DATA state transmitted over the connection 152.5. The second comprises a logical OR circuit 196 and three logical AND circuits 197 to 199. Finally, a logical OR circuit 200 produces the signal transmitted over the connection 110 for the resetting of the sequence register 100 in the sequence generator 55.

The state processor 74 exchanges a very great number of signals with all the other components of the control member, as is illustrated in FIG. 5. In order to simplify the explanation, the signals will be given the same reference numerals as those allocated to the circuits which gives them out or the connections which transmit them. From the sequence generator 55, it receives the state signals from the buffer register 101 (101a, 101b and 10c) and from the decoder 102 (102.1 and 102.7), and the read pulses 113, the negative acknowledgement of reception pulses 134 and the beginning of message pulses 135. It supplies it with the signal for the selection of the nature of message 108, the reset signal 110 and the transmission/reception control signals 151.1 and 151.2 leaving the toggle circuit 151.

The connections with the addressing processor 52 are 78 and 80 for the control of the register 72, 90 for the triggering of a search sequence, 94 for writing in the read-write store 71, and 96 for the re-activation sequences. In exchange, the addressing processor 52 supplies the output of the stores 70 and 71 via the connections 92 and 93.

The state processor 74 likewise receives the character-present signal 56 from the receiver 46, the error-in-text-received signals (210.1 TRUE and 210.2 FALSE) from the buffer store 53, and the end-of-text signal 211 from the buffer store 58.

The buffer stores 53 and 58 are sequential storage members of the circulating register type, or the equivalent. The buffer store 53 receives information from the receiver 46 via the connection 54 and a writing instruction from the sequence generator 55 via the connection 112. It supplies two state signals to the state processor 74, via the connection 210. These complementary signals, known as "error text" actually group together all the cases of error which can be detected during the arrangement of the text in the buffer store 53, particularly the errors in length detected by comparison of the length character appearing at the head of the text and by deducting the characters which compose it, and all the other errors in transmission which can be detected by any redundancy processes used in this portion of the message.

The buffer store 58 supplies the information to be transmitted, character by character, via the connection 61 in accordance with the read control 158. It supplies the sequence generator 55 with and end-of-text signal 211.

The state processor 74 likewise exchanges signals with the utilization portion of the station, represented symbolically in FIG. 5 by the utilization member 220. These signals comprise the start signals from the connection 211 (ACTIVE 221.1 and INITIALISATION 221.2), the two notification signals from the connection 222, end-of-operation 222.1 and re-setting 222.2, and the transmission-instruction signal 22.

The relations between the utilization member and the buffer stores are too dependent on the nature of the former for them to be able to be illustrated precisely in FIG. 5. They are defined in a general manner in the flow diagram of FIG. 13 which will be commented on at the end of the explanation of operation which follows.

The operation of the control member which has just been described can be decomposed into a certain number of simple sequences, each of which corresponds to an essential function of said control, namely:

reception sequence,
transmission sequence,
table searching sequence, the course of these sequences being defined by the internal operation of the sequence generator 55 for the first two and of the addressing processor 52 for the third.

These sequences are interlinked, with a view to carrying out the procedure according to the invention, by the state processor 74, depending on the activity of the network and of the utilization member.

The exchanges of information with the network are effected by means of the lines 41 and 42, the coupler 40, the receiver 46 and the transmitter 49. The signals received by the line 41 are converted by the demodulator 44 into serial logic signals which are transmitted by the connection 48 to the receiver 46 and, via the gate 47, to the modulator 43 which re-transmits the signals in a suitable form, to the rest of the network, via the line 42.

Thus, during the reception sequences, the gate 47, kept open by the line 151.2, permits the systemmatic retransmission of the messages received over the line 41 to the line 42, which ensures the transparency function which is indispensable for circulation over the network, of every message to all the stations at once. On the contrary, during the transmission sequences, the gate 47 is kept closed and the tranmitter 49 can transmit the information which is supplied to it via the multiplexer 62.

At the beginning of a reception sequence, the sequence generator 55 is in a state known as the "reference state", in which the sequence register 100 and the buffer register 101 are both zero. After recognition, by the receiver 46, of the initial synchronisation sequence (e.g. a distinctive message-start signal), and reception by the receiver of the first message character, the character-present signal which it supplies over the connection 56 triggers the progression logic 111 via the circuits 137 and 123, through change of state of the toggle circuit 114 and through the circuit elements 115, 120 and 117.

This causes the sequence register 100 to progress through its successive states 1, 2, 3 and 4 (corresponding to the binary configurations 001, 010, 011, 100 of its three toggle circuits); the stopping of this progression in the state 4 is ensured by the circuits 120, 122, 124 and the signal 102.4. During this progression, the sequence register 100 scans, via connection 68, the first four locations of the code store 57, and this submits to the comparator 51, over the connection 60, the binary configurations of the characters NEG, ENT, FIN, and DON in this order. The comparator 51 therefore compares, in succession, these four characters with the first character received which is present on the connection 54. The positive result of one of these comparisons is transmitted via the connection 67 and causes the copying of the sequence register 100 in the buffer register 101, through the circuit 121 and the connection 107, as well as the sending of the beginning-of-message or negative signal (the latter in the case where a message NEG is received) to the state processor 74, through the circuits 135 and 134.

In the case where a code ENT, FIN or DON has thus been received, the following character-present signal causes the sequence register 100 to switch into state 5 (binary 101) via the circuits 119 and 117, and causes the copying of the second character received in the selection register 72 via the circuit 127 and the connection 77.

When the register 100 is in the state 5, the fifth location of the code store 57 is interrogated, which contains the address character peculiar to the station under consideration, which is then submitted to the comparator 51 via the connection 60. Simultaneously, the store 70 submits, via the connection 92, the existence bit corresponding to the second character of the message received.

After reception of the third character, the sequence generator 55 copies the contents of the toggle 101a in the location thus addressed of the store 71, via the connection 95 and the circuit 132, which registers active for (DON or ENT) or inactive (for FIN). On the other hand, the character-present signal on the connection 56 causes the sequence register 100 to switch into state 6 (binary 110), then, if the two signals available over the connections 67 and 92 were simultaneously in the TRUE state, into state 7 (binary 111), through the circuits 117, 118 and the delay element 116.

The progression of the sequence register 100 is then interrupted by the circuit 119 until the end of the message. Moreover, in the state 7, and if the toggle 101c is in the state 1 (DON recognized), the character-present signals received via the connection 56 are reflected back to the buffer store 53 via the circuit 128 and the connection 112, which causes the storing of the text characters received in the buffer store 53 via the connection 54.

In the state 6, which corresponds to a message not intended for the station under consideration, any text is not stored.

In a transmission sequence, the sequence register 100 assumes all its states from 0 to 7 in succession. The state 0 is a waiting state, during which the transmitter 49 transmits to the line 42 the sub-sequence of initial synchronisation, following on the change of state of the connection 151.1,2 which, at the same time, causes the closing of the gate 47. The first ready signal submitted by the transmitter 49 via the connection 66 causes the development of the states 1 to 5 in a similar manner to the reception sequence. During this development, the connection 63 directs towards 49, via the multiplexer 62, the output 60 of the code table, and the comparator 103 compares the state of the sequence register 100 with the message code formed from the states: DATA, MAINTENANCE, LISTENING or inactive, supplied by the state processor 74 via the connection 108. The output of this comparator is transmitted to the transmitter 49 via the connection 109, the circuits 130 and 136, and the connection 65, which causes the transmission of the appropriate function character.

The second ready-to-transmit signal causes the transmission instruction over the connection 65, through the circuits 131 and 136, and the switching of the register 100 into the state 6 through the circuits 129, 117 and the connection 106. The connection 63 then causes the direction of the connection 59, via the multiplexer 62, towards the transmitter 49. The third ready signal causes the same transmission order and causes the sequence register 100 to switch into the state 7. The signal 102.7 from the connection 63 then directs the output 61 of the buffer store 58 towards the transmitter 49, and the following ready signals cause the transmission of any text characters via the connection 65, without causing the progression of the sequence register 100 because of the circuit 133 via the connections 113 and 158.

This transmission is interrupted by the resetting of the sequence register 100, caused by the state processor 74 via the connection 110. The sequence generator 100 is then ready to assume a fresh transmission or reception sequence, the selection of this being effected by the state processor 74 via the connection 151.1,2 and the circuits 125, 126, 121, 124 and 130.

In the case of a negative acknowledgement of reception NEG being transmitted, which is determined by the LISTENING state of the state processor 74, the transmission sequence is interrupted in state 5 after transmission of the first character.

A transmission sequence is always preceded by an addressing operation, possibly followed, in the MAINTENANCE state, by a search sequence. The addressing operation consists in entering, in the selection register 72, the address supplied by the utilization member via the connection 75 in the DATA state or the station's own address, in the MAINTENANCE state, via the connection 80.

The search sequence is controlled by the signal 90 leaving the state processor 74, which sets the toggle 81 and causes the selection register 72 to progress via the circuit 87. The astable circuit 82 is then released and supplies pulses which, via the circuits 85 and 87 and the connection 79, cause the selection register 72 to progress. For each of the states of this selection register 72, the existence and activity bits are combined by the AND circuit 84 and, if this combination is TRUE, the following pulse supplied by the astable circuit 82 passing through the AND circuit 83 resets the toggle 80, thus interrupting the progression of the selection register 72. In this case, the circuits 85 and 88 serve to inhibit the last progression. Otherwise the pulse supplied by the astable circuit 82 causes the selection register 72 to progress.

Thus there are obtained, in the selection register 72, the address of the first location of the stores 70 and 71 in the existing and active state, following, in the agreed order, the station's own address (after the first search), or the previous address selected (possible following searches). The re-activation signal 96 eliminates, as a result of the OR circuit 86, the influence of the activity signal 93 and thus renders it possible to search for the first following existing one. The signal for resetting the toggle 80 is returned via the connection 91 as an end-of-search signal to the state processor 74 where it serves to control the start of a transmission sequence.

The transition of the transmission and reception sequences which have just been described is controlled by the state operator 74. This transition is defined first of all by two variables of internal state. The first variable has five states known as PASSIVE, BEGINNING, LISTENING, MAINTENANCE and DATA, and it is represented by the state of the state register 150. The second variable is binary; it corresponds to the nature (transmission/reception) of the sequence in progress, or which has just been completed, and it is defined by the state of the toggle circuit 151; this second variable is of no significance in the PASSIVE state and can only assume the value "reception" in the BEGINNING state.

The transition logic described above determines the changes of state of these variables in accordance with the transitions defined previously.

OPERATION OF THE SYSTEM

When the station is started, the initialisation signal 221.2 brings the station into the PASSIVE state and the state register 150 is positioned in the corresponding state.

According to the transition T0:

In the PASSIVE state, the sequence generator 55 is kept in the reference state of zero, preventing any activity of the control member, via the circuit 200 and the connection 110.

According to the transition T1:

The circuits 178 and 179 produce the signal 152.2 for bringing the state register 150 into the state 2 when this is in the state 1 at the beginning and when the ACTIVE signal is supplied by the utilization member via the connection 221.1. On the other hand, the signal 152.2 sets the re-activation counter 172 to zero, brings the toggle circuit 151 into the reception state and resets the register 100 through the connection 110, via the circuits 196 and 200. According to the transition T2:

The beginning-of-message signals 135, transmitted by the sequence generator 55 after recognition of a character ENT, FIN or DON, cause the re-activation counter 172 to progress via the circuits 173 and 174. The reception of a message having an error in the first three characters (or at the head) causes the appearance of the signal 152.2 via the circuit 179 and the circuits 177 or 163 and 165, which causes the resetting of the re-activation counter 172 and the maintenance in the BEGINNING state.

The end of message received, detected by the timing circuit 160 causes the resetting of the sequence register 100 via the circuit 200 and the connection 110. This occurs, likewise, in all the states.

According to the transition T3:

When the re-activation counter 172 reaches the end of its cycle, it renders the signal 96 TRUE which, through the circuits 180a and 181, enables the circuit 180b to produce the signal 152.3 when the beginning-of-message signal 135 appears. The control member then switches into the LISTENING state.

According to the transition T4:

The prolonged absence of a message is detected by the triggering of the timing circuit 162. Its output signal causes, via the circuits 182 and 186, by means of the circuit 187, the appearance of the signal 152.4 which causes the control member to switch into the MAINTENANCE state.

According to the transition T5:

The recognition by the sequence generator 55 of a function character ENT, FIN or DON causes the beginning-of-message signal 135 to appear. This sets the toggle circuit 163.

The end-of-message signal produced by the circuit 160 resets the sequence register 100 and, via the circuits 192 and 191, sets the toggle circuit 151 in the transmission state if the states 101c, 102.7 and 210.1 are all TRUE, that is to say if an erroneous text has been received. The control member then executes a transmission sequence of a message NEG, defined by the state FALSE, FALSE, TRUE of the three signals of the connection 108. After transmission of the character NEG, the signal 65 restores the toggle circuit 151 to the reception state via the circuits 198 and 196 and resets the sequence register 100 via the circuits 200 and 110. The control member then remains LISTENING, while awaiting a fresh message.

In the case of a message satisfactorily received but not intended for the station under consideration, the "end of message" signal only causes the resetting of the sequence register 100 via the circuits 200 and 110, thus leaving the control member in the LISTENING state.

According to the transition T6:

The triggering of the prolonged absence of message circuit 162 causes, via the circuits 182 and 186, the appearance of the signal 152.4 for switching into the MAINTENANCE state.

The end-of-message signal produced by the timing circuit 160 resets the sequence register 100 and produces, through the circuit 164, the message-accepted signal if the sequence register is in its state 7 (102.7) and unless the buffer store 53 signals an error via the connection 210.2. If the buffer store 58 does not contain a text ready for transmission, the message-accepted signal passes through the circuits 185 and 186 and produces the signal 152.4 whence there is switching into the MAINTENANCE state. This signal, through the connection 80, indicates the station's own address in the selection register 72 and starts a search sequence via the circuits 170 and 90. The end-of-sequence signal via the connection 91 and the circuit 191 sets the toggle circuit 151 in the transmission state, which causes the start of a maintenance transmission sequence, characterised by the state FALSE, TRUE, FALSE (hence: message ENT) or FALSE-TRUE-TRUE (hence message FIN) of the three signals of the connection 108, according to the state of the active signal 221.1. This same signal resets the repeat counter 166 via the circuit 168.

According to the transition T7:

The message-accepted signal produced by the circuits 160 and 164 causes the appearance of the signal 152.5 via the circuit 190, if the transmission instruction 223 is supplied by the utilization member 220, hence a switching into the DATA state and the indication in the selection register 72 of the address of the recipient station submitted by the utilization member over the connection 75. After the delay time defined by the element 195, this same signal brings the toggle circuit 151 into the transmission state, via the circuits 194 and 191, if the recipient station exists and is active according to the contents of the stores 70 and 71, which is manifested by the state of connections 92 and 93. This same signal resets the repeat counter 166 via the circuit 168 and specifies to the sequence generator 55, via the connection 108, the transmission of a message DON.

According to the transition T8:

Following on the transmission of a maintenance message, a non-response is detected by the timing circuit 161, the output of which causes the repeat counter 166 to progress via the circuit 167. If this counter has not completed its cycle, it provides the repeat signal 166.2 which, through the circuits 193 and 191, causes the toggle circuit 151 to switch into the transmission state and thus causes the re-transmission (repeat) of the same message. If the counter 166 has completed its cycle, it causes the notation "inactive" in the store 71, via the connection 94 and supplies the "fresh search" signal 166.1 which, via the circuits 170 and 90, triggers the search logic 73 without starting the register 72 and, at the end of the search, causes the corresponding transmission via the circuits 91 and 191.

If the re-activation counter 172 has completed its cycle (output 96), the signal is directed towards the first existing station and, if this is not active, the repeat process described above is prevented by the circuit 193; a non-response then starts a search sequence via the circuits 169 and 170, regardless of the state of the counter 166.

According to the transition T9:

The reception of a message NEG is expressed by the negative signal 134 which actuates the repeat counter 166 in the same manner as the non-response signal as stated above, but which does not actuate the search logic. Thus, in case of non-response or of negative response, the toggle circuit 151 is brought into the transmission state via the circuits 191 and 193, the connection 166.2, the counter 166 and the circuit 167, which causes the repetition of the same message.

According to the transition T10:

The reception of a character ENT, FIN or DON causes the beginning-of-message signal 135 which, via the circuit 180b, determines the signal 152.3; the control member then switches into the LISTENING state therefore.

According to the transition T11:

The reception of the character ENT, FIN or DON likewise causes the return to the LISTENING state. Moreover the trailing edge of the state signal 153.5 sets the toggle circuit 157 which thus notifies the utilization member, via the connection 222.1, of the end of the transmission operation. This same connection enables the utilization member to reset the toggle circuit 157 by the signal 222.2.

According to the transition T12:

The end of the repeat cycle (counter 166) determines:

via the connection 94, the writing in the store 71 of the TRUE state 102.1 for a negative message (hence active) and FALSE for a non-response (hence inactive), via the circuits 184 and 186, the switching to the MAINTENANCE state, the indication of the station's own address in the register 72 and the setting of the toggle circuit 157 (notification to the utilizing member), via the circuit 170 and the connection 90, the resetting of the repeat counter 166 and the start of the search sequence.

When there is a transition T7, the indication in the register 72 of the recipient's address causes the state of said recipient, according to the stores 70 and 71, to appear over the connections 92 and 93. If this state is not "existing and active", the starting of the sequence of transmitting a message DON is inhibited by the circuit 194 and, on the contrary, the NOR circuit 188 enables the signal 152.5, delayed by the element 195, to pass through the circuit 183 and, via the circuit 186, to cause the switching into the MAINTENANCE state, which sets the notification toggle circuit 157.

According to the transition T13:

the reply to a message FIN or the detection of the prolonged absence of a message by the circuit 162 causes, via the circuits 176 and 175, the appearance of the signal 152.1, which causes the station to switch into the PASSIVE state and thus stops the operation of the control member.

According to the transition T14:

The presence, in a message, of a non-identifiable first character leads to the absence of the beginning-of-message signal 135. The toggle circuit 163 is then not set when it receives the end-of-message signal from the circuit 160. This then passes through the circuit 165 and, via the circuit 179, causes a signal 152.2 to appear, which causes the control member to switch into the BEGINNING state.

According to the transition T15:

As above, return to BEGINNING after end-of-message not preceded by beginning-of-message.

According to the transition T16:

Return to BEGINNING as above and, moreover, the circuit 177 renders it possible, when the address received corresponds to a non-existent station, to switch likewise into the BEGINNING state in this latter case. In every case, the return to BEGINNING is accompanied by the resetting of the re-activation counter 172.

ILLUSTRATIVE OPERATION OF A UTILIZATION DEVICE (FIG. 13)

In FIG. 13, a logical behaviour of a utilization member compatible with the control member previously described, is proposed in the form of a flow diagram.

The notations are as follows

The indicator FULL 1 indicates the availability of the buffer store for the reception of texts: the value false (F) signifies that the buffer is empty, available for the reception of a text. The value true (V) signifies that the buffer is occupied by a text received.

The indicator FULL 2 indicates the availability of the buffer store for the transmission of texts; the value F signifies that the buffer is available to the utilization member which can then introduce therein a text for transmission; the value V signifies that the utilization member has introduced a text into the buffer and that the transmission (whether it succeeds or fails) has not been effected.

The indicator NOTIF indicates the state of advancement of a transmission operation; the value V signifies that an operation of transmitting a text has been effected (whether it has succeeded or failed); the value F signifies that no operation of this type is in progress, or that it has not yet been effected.

The indicator MARCHE denotes the control, by the utilization member of the start/stop of the control member; the value F signifies that the control member should cease to communicate; the value V that it should prepare itself or continue to communicate.

Certain changes of value in these various indicators are exclusively in the control of the utilization member. These are:

the resetting of FULL 1 from the value V to the value F, indicating to the control member that it can copy a fresh text received in the corresponding buffer store.

The setting of FULL 2 from the value F to the value V, indicating to the control member that a text applying for transmission is present in the transmission buffer store.

The resetting of NOTIF from the value V to the value F, which indicates to the control member that it should try to transmit the text present in the transmission buffer store, if the indicator FULL 2 is at V.

Moreover, let it be recalled that where appropriate (failure of transmission of a text), the control member will submit, in the indicators symbolized by EX and AC, the state of existence and of activity (values V or F) which correspond to the station for which the text is intended, as it is noted in the control member's table.

Finally, there should be noted:

EXRBUF: The use by the utilization member of a text present in the reception buffer store, TXTRDY: The indication, internal to the utilization member, of the presence of a text applying for transmission and not yet copied in the transmission buffer store, value: V or F, FEEDTBUF: The copying of a text applying for transmission in the corresponding buffer store, ERROR: An abnormal ending to the work of the utilization member, ULTDECIS: Decision, in the event of failure of the transmission of a text (recipient inactive), taken by the utilization member, BEGIN: Beginning of the activity of the utilization member, TEMPDECIS: Decision, in the event of failure of the transmission of a text (recipient active), taken by the utilization member, CONDFIN: Indication, internal to the utilization member, of a condition of end of work, value: V or F, FIN: Normal ending of the activity of the utilization member.

Note:

"variable" ← "value"

the attribution of a value to one of the indicators previously described.

The flow diagram of FIG. 13 is explained as follows, by the logical tests 301 to 309.

After the starting of the utilization member, at 301, the two indicators FULL 1 and FULL 2 are started at the value F, the indicator MARCHE at the value V, which will cause the starting of the control member (output of the PASSIVE state), and will bring it into a position to accept the texts received, when the moment arrives.

At 302, which is a general point of return, the end of work test is carried out. If it is positive, the stop condition is given to the control member and the work is completed normally.

At 303, a test is carried out to find out whether a text has been satisfactorily received; if this is the case, this text is used and the buffer store is made available to the control member for a fresh reception.

At 304, a test is carried out to find out whether a text transmission operation has been completed. If not, a test is carried out at 305 to find out whether the transmission buffer store is free; if not, which means to say that an operation of transmitting the text present in this buffer store is in progress, there is a return to the general point of return at 302.

At 306, where the transmission buffer store is free in every case, because no transmission operation is any longer in progress, a test is carried out to find out whether a text applying for transmission is ready. If not, there is a return to the point of general return 302. Otherwise, a text is copied in said buffer store, then the indication of a full buffer is given at the same time that the notification of end of operation is cancelled.

At 307, which is reached if an end of operation of transmitting a text is recognized, a test is made to find out whether the transmission buffer is empty (FULL 2 equal to F). If it is, it means that the transmission of the text has been effected correctly and the next transmission is decided at 306. If it is not, it means that a condition has led to the failure of the operation and the buffer is noted as empty so as not to repeat the following tests subsequently and uselessly.

At 308, by the test of the indicator of the real existence of the recipient station in the network, the fact that the failure is not due to a false address supplied by the utilization member itself (following on an internal error in this) is verified. If this is the case, the utilization member effects an abnormal end after having indicated stopping to the control member.

At 309, the utilization member tests the activity indicator, which corresponds to the recipient station. If it is noted as active, this is necessarily because it has refused the proposed text by successive messages NEG, and it is temporarily, no doubt for valid reasons, incapable of accepting messages of the corresponding type. The utilization member then reaches a decision to postpone, abandon or maintain the proposed text. If, on the other hand, the station is noted as inactive, the utilization member reaches the decision to postpone or abandon the proposed text. In both cases there is a return to 306 to decide on a fresh transmission.

The flow diagram of FIG. 13 has innumerable variants, depending in particular on the actual nature of the utilization member. For example, if the latter is a computer working with multiprograms, it would be divided into a first flow diagram, denoting the exchanges with the control member (first subsidiary task), a second flow diagram denoting the treatment and the composition of the messages (second subsidiary task); the two subsidiary tasks cohabiting, in time, under the control of an allocation program of the computer.

A specific form of embodiment of the invention has been illustrated in the preceding description. It is obvious that certain logical functions could be assumed by other equivalent logic circuits or by known techniques of programming.

What we claim is:

1. A method of communicating data among a plurality of mutually remote stations equipped for transmitting and receiving data signals at a rate within a predetermined tolerance of a predetermined transmission rate on a common transmission channel through which a message transmitted by one station is made available for reception at all other stations of said plurality of stations without message storage delays at any intermediate station distinct from the sending station, comprising the steps of:

providing at all stations a looped list of all said stations, by address codes respectively individual to the several stations, in the same predetermined order;

locally storing data originating at any station and ready for transmission to any other station together with the identification of the latter addressee station;

observing the condition of the transmission channel at each station during desired periods of activity of the respective stations and receiving messages detected by observing said channel condition as specified in the receiving step set forth below;

sending messages, within a predetermined period after said transmission channel has become silent, in one of at least two formats, messages of all formats being preceded by the transmission of a synchronization signal that identifies the beginning of a message, followed by a source address code identifying the sending station and thereafter followed by a destination address code identifying another of said stations as the station intended to send the next message within a period of a predetermined length following the end of the current message, said first two formats including a first format in which said destination address code is followed by a data field corresponding to the data awaiting transmission at the sending station and a second format in which the message ends with the transmission of the destination address code;

determining the destination address code in messages of said first format in accordance with an addressee station identification supplied with data awaiting transmission, and determining the destination address code in messages of said second format by selecting the next station on said looped list, said step of sending a message being performed only within a period of said predetermined length following reception of a preceding message in which the destination code received was recognized as the station's own address code, except when the transmission channel has been silent for a period of a second predetermined length much longer than said first predetermined length, receiving at least the control codes, source address codes and destination address codes included in messages detected when the station is not sending, detecting destination address codes identifying the receiving station and as a preliminary to sending steps set forth above, and receiving data fields of messages of the first format at least in the cases of messages of which the destination address code has been detected to be that of the receiving station.

2. A method as defined in claim 1, in which the steps of sending messages include also the sending of messages in a third message format which differs from the said second message format only in the specific control code that identifies the format, the step of sending messages in the third format being performed only when it is desired to terminate the activity of the station.

3. A method as defined in claim 2, in which there is also performed the step of detecting whether a detectable error exists in the received data field of each message of said first format and whenever the detecting step reveals such an error, the step of sending the next message is performed, by the station addressed by the preceding message, by sending a message in a fourth format which is preceded by the transmission of a synchronization signal that identifies the beginning of the message, and differs from the other formats in that the message contains only a specific control code identifying said fourth message format and, further, in which method the step of sending a message following the transmission of a message in said fourth format is constituted by a repetition of the preceding message of the first format by the station that originally sent it, and in which method the reception of said messages of the fourth format ceases with reception of the control code and induces no response by any station other than the one that sent the preceding message.

4. A method as defined in claim 3, in which there is also performed the step of detecting whether an error exists in a control code, an address code or any part of a message preceding either of them, and, in the event such an error is detected at any station, the step of refraining from sending any message for at least a period of said second predetermined length unless and until such station is designated to send the next message by means of a message in which no such errors are detected, and in which method, further, a station that has sent a message of said first, second or third format and that receives no message within a period of said first predetermined length following the end of the message it has sent performs a retrial step by sending the same message again and, in the event of still receiving no message thereafter within said period of said predetermined length, repeats the retrial step up to a predetermined maximum number of times, and in which method, further, when a station has performed said retrial step for said predetermined maximum number of times for a message of the said first format, such station performs the step of sending a message of the second format unless the station has been furnished an indication that a local end of activity is desired, in which case a message of the third format is sent in the step of sending the next message.

5. A method as defined in claim 4, further comprising the steps of:

maintaining at each station a dynamically alterable local table of activity status of said stations organized according to the order of said looped list of stations;

updating said table of status indications by reference to reception of messages of said first, second and third format that are received free of detected errors in control codes, address codes or any preceding portion of said messages, by writing in said table an activity indication with respect to the stations identified by the respective source address codes in response to reception of messages of said first and second formats and writing in said table an inactivity indication with respect to the stations identified by the respective source address codes in response to messages of said third format, and in the event a station has exhausted the said predetermined maximum number of retrial steps for transmission of a message of the first, second and third format, writing in said table an indication of inactivity with respect to the station identified by the destination address code of such message and, in the event that the message which was the subject of said predetermined number of retrial steps was one of the second or third format, the sending by the station that performed the retrial steps of a message of the same format including a destination address code related to the next station on said looped list following the station identified by the destination code in the messages sent in the retrial steps.

6. A method as defined in claim 5, further comprising the steps of recognizing whether the destination address code related to data awaiting transmisssion at a station selected by a previous message, for sending the next message, matches the destination address code of a station which is designated as inactive in said local table and, if so, sending a message of said second format instead of a message of said first format, including a destination address code designating the next station following said selected station in said common looped list order, and for a station that, having no data awaiting transmission, has just sent a previous message of the second or third format including a destination address code which matches that of a station that is designated inactive in the said local table in lieu of performing a retrial step, sending a message of the same format including a destination address code designating the next station of said looped list following the station identified by the destination address code of the previous message.

7. A method as defined in claim 6, further comprising the step of:

for each station, when it is selected by receiving a message including it own address as destination address code and if there is no data awaiting transmission at this station, sending a second or third format message including as the destination address code, the address of the next active station according to the said local table and the said looped list order in a predefined proportion of said occurrences and in the remaining of the said selection occurrences sending a second or third format message according to the method of claim 6, this last mentioned choice being valid up to the next selection occurrence.

8. A method as defined in claim 7 further comprising the steps of:

providing at each station a resettable local timer that defines a second predetermined local time period which is substantially longer than said predetermined period within which messages normally succeed each other, and which has a different value for each of said stations;

detecting at each station the existence of a silent period exceeding said second predetermined period length, and in the event that any station detects a silent period of said silent period duration, writing an indication of inactivity with respect to each of the other stations in said local table and thereafter sending a message of the said second format and proceeding in such sending step and thereafter according to the method specified therefor in said claim 7.

9. A communication system for data transmission among a plurality of mutually remote stations in communication over a transmission channel to which they are connected so that a transmission by any one station may be received by the other stations without delay by message storage at any intermediate station of said stations, said system comprising at each of said stations:

means for transmitting bit sequence messages, at a rate within a predetermined tolerance of a predetermined rate, selectively in any of four different formats each beginning with the transmission of a synchronization signal that identifies the beginning of the message and of a control code that identifies the format of the message, said four formats being differentiated as follows — in the first three formats said control code is followed by a source address code that identifies the sending station and said source address code is followed by a destination address code that identifies a station other than the sending station that is to send the next message within a first predetermined maximum delay period, in the first format said destination address code is followed by a data field and the destination station which is intended to receive the data field is the station designated in the said destination address code preceding the data field, in the first and second formats the control code that identifies the format indicates to all stations the active status of the sending station, whereas in the third message format the control code that identifies the format indicates to all stations the end of activity of the sending station and whereas in the fourth format the control code that identifies the message format is the only information transmitted and indicates to the station that sent the previous message the need for repeating the sending of said previous message;

first receiving means for detecting the state of said transmission channel and thereby detecting the beginning of each message and receiving the bit sequences thereof;

second receiving means for detecting the end of each message bit sequence;

third receiving means for identifying the said control codes received as part of said message bit sequences;

fourth receiving means for recognizing a destination address code received as part of a message bit sequence as the receiving stations own address code;

fifth receiving means for recognizing the presence of an error in the control code, source address code or destination code of a message or in said synchronization signal and for causing said station to ignore the message in the event of such an error being detected and for detecting the presence of an error in the data field portion of a message of said first format;

first storage means responsive to the first, third and fourth receiving means for storing the source address and the data field received as part of the bit sequence of a message of said first format;

second storage means for storing and delivering to said transmission means data awaiting transmission together with a related destination address code for these data;

third storage means for maintaining a record of the current activity or inactivity status of the respective stations;

activity status means responsive to said first, third and fourth receiving means for writing into said third storage means indications of the activity of the source station of any message of the first or second format and the inactivity status of the source station of any message of the third format according to the control code and the source address code of said message, also for verifying before transmission the status of a destination station to which data awaiting transmission in said second storage means is related, and for scanning said third storage means in a predetermined order of stations to select the next active station following the sending station in said order, said status control means including, for use in the scanning function just mentioned, a looped list of all stations of said plurality of stations listing them in said predetermined order which order is the same in the lists at all said stations;

first timing means responsive to the transmitting means at the same station, at the end of each transmitted message of the first, second or third format, for detecting a duration of a silent period following the end of said message which is greater than said predetermined maximum delay period;

second timing means responsive to said first and second receiving means for detecting a silent condition of said channel which exceeds a second predetermined delay period which is significantly greater than said first predetermined maximum delay period;

station state control means including an electronic logic network responsive to the condition of said transmitting, receiving, storage, control and timing means and having a means for applying a local command for activity or inactivity as the case may be, and being responsive to said local command means, for initiating messages of said first format according to the availability of data awaiting transmission and to the condition of said local command means, as well as to the condition of said fourth receiving means produced in a previous message, also for automatically initiating the transmission of a message in said second format in response to an absence of data awaiting transmission in said first storage means and the condition of said fourth receiving means resulting from reception of the previous message, as well as the condition of said local command means, also for automatically initiating the transmission of a message of said third format in response to a condition of said local command means commanding inactivity status and the condition of said fourth receiving means resulting from the last previous received message, and also for automatically initiating the transmission of a message of said fourth format in response to a condition of said fifth receiving means indicating detection of a data field error resulting from reception of the last previous message, provided the condition of said local command means signifies a command for continuation of local activity.

10. A communication system as defined in claim 9, in which said transmission channel is made up of unidirectional lines each connecting one of said stations to another and in which all stations having both incoming and outgoing lines of said channel connected thereto have means for substantially immediately retransmitting on every outgoing line messages received on an incoming line when the transmitting means of the same station is not sending a new message and also have means for preventing the operation of said retransmitting means during the period of sending of a new message by said transmitting means.

11. A communication system as defined in claim 9, in which said transmission channel is made up of a unidirectional line looped through all said stations and in which means are provided at each station for assuring substantially immediate further transmission beyond said station of messages received at said station, except for periods when said station is transmitting, and means for preventing operation of said further transmission assuring means during the period of transmission of a new message by said transmitting means which message originates at the station of which said transmitting means is a part.

* * * * *